United States Patent [19]

Hwang et al.

[11] Patent Number: 4,498,186

[45] Date of Patent: * Feb. 5, 1985

[54] DATA SET DIAGNOSTIC SYSTEM

[75] Inventors: Jong-Yeong H. Hwang, Fremont, Calif.; Stevan J. Thayer, Freehold; Bonnie A. Zimmer, Howell, both of N.J.

[73] Assignee: AT&T Bell Laboratories, Murray Hill, N.J.

[ * ] Notice: The portion of the term of this patent subsequent to Aug. 9, 2000 has been disclaimed.

[21] Appl. No.: 494,111

[22] Filed: May 12, 1983

Related U.S. Application Data

[62] Division of Ser. No. 196,157, Oct. 10, 1980, Pat. No. 4,398,297.

[51] Int. Cl.³ .............................................. H03K 13/32
[52] U.S. Cl. ......................................... 375/7; 375/10; 371/15; 179/2 DP
[58] Field of Search .................... 375/7, 8, 10; 371/15, 371/16, 17, 20, 22; 370/13, 14, 15, 16, 17; 324/73 AT; 179/2 DP, 175, 175 R

[56] References Cited

U.S. PATENT DOCUMENTS

| Re. 30,037 | 6/1979 | Bass | 371/22 |
|---|---|---|---|
| 3,743,938 | 7/1973 | Davis | 370/15 |
| 3,787,810 | 1/1974 | Wiggins et al. | 179/175 |
| 3,910,322 | 10/1975 | Hardesty, Jr. et al. | 371/15 |
| 3,914,743 | 10/1975 | Fitch et al. | 340/147 R |
| 4,046,964 | 9/1977 | Daugherty et al. | 370/15 |
| 4,055,808 | 10/1977 | Holsinger et al. | 375/10 |
| 4,245,342 | 1/1981 | Entenman | 370/16 |
| 4,273,955 | 6/1981 | Armstrong | 370/13 |
| 4,311,882 | 1/1982 | Johner et al. | 370/13 |
| 4,317,207 | 2/1982 | Fujimura et al. | 375/121 |
| 4,351,059 | 9/1982 | Gregoire et al. | 179/175.2 R |
| 4,398,297 | 8/1983 | Hwang et al. | 375/10 |

Primary Examiner—Robert L. Griffin
Assistant Examiner—Stephen Chin
Attorney, Agent, or Firm—Ronald D. Slusky

[57] ABSTRACT

A voiceband data set network includes a control data set (10), a plurality of tributary data sets (4a, 4b . . . 4n) and a diagnostic control device (5). User-provided data is communicated between the control data set and the tributary data sets via a primary channel within a four-wire private telephone line (11, 12). Diagnostic and control information is communicated between the control data set and the tributaries via a secondary channel within the private line. Diagnostic and control information is communicated between the diagnostic control device and the control data set, with which it is co-located, via a control channel. Each data set includes a data set diagnostic unit (50), or DDU, via which it transmits and receives the diagnostic and control information. Communications among the DCD, DDUs, and primary controllers within the data sets, are carried out on a link-by-link basis, with the DDUs serving as message switching nodes and with communications over each link being principally comprised of requests and reads. The DCD, DDUs and primary controllers communicate in a hierarchy in which requests and reads are always directed downstream. The tributary data sets are provided, however, with a way of directing request-type message texts upstream.

6 Claims, 25 Drawing Figures

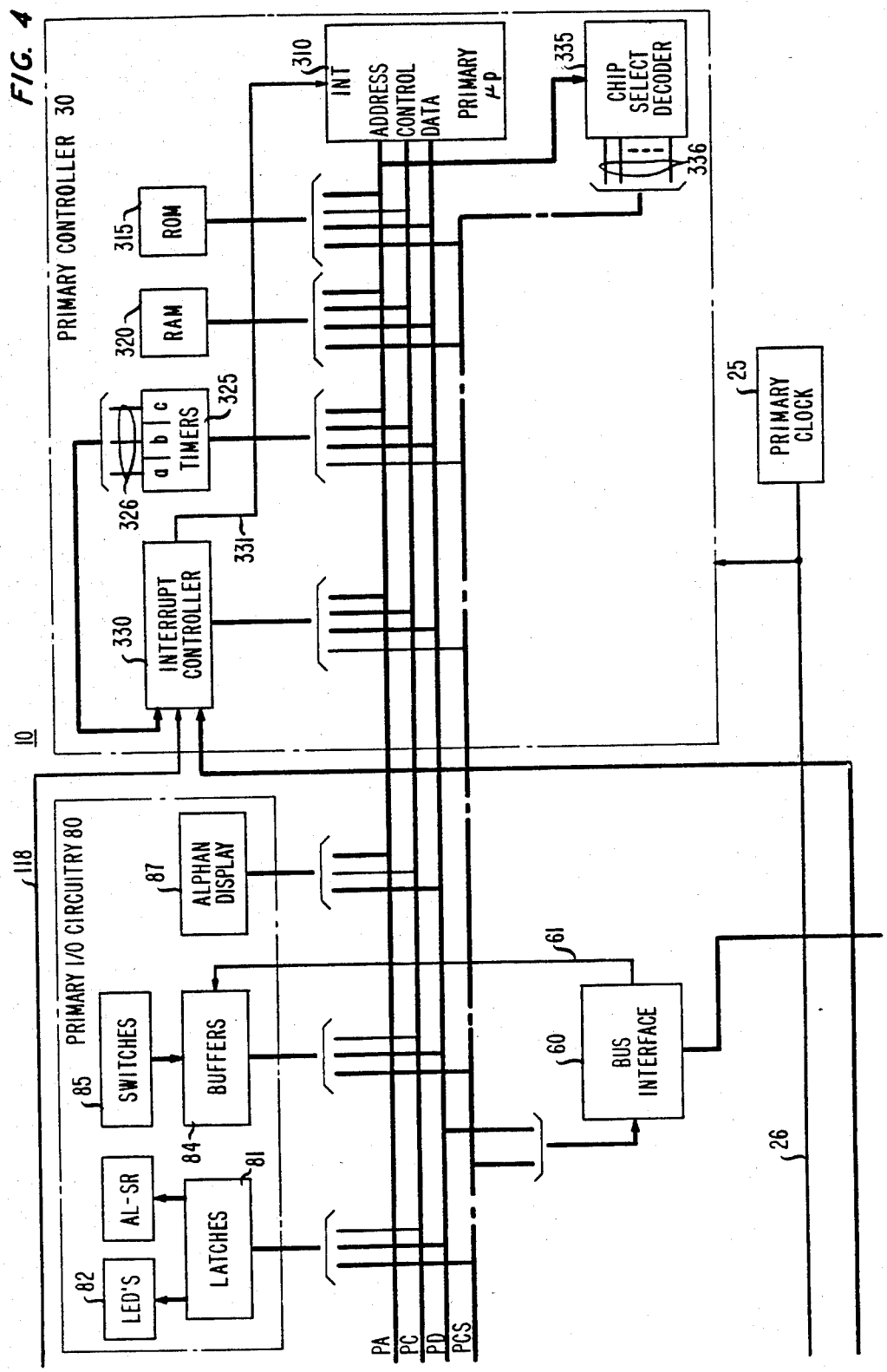

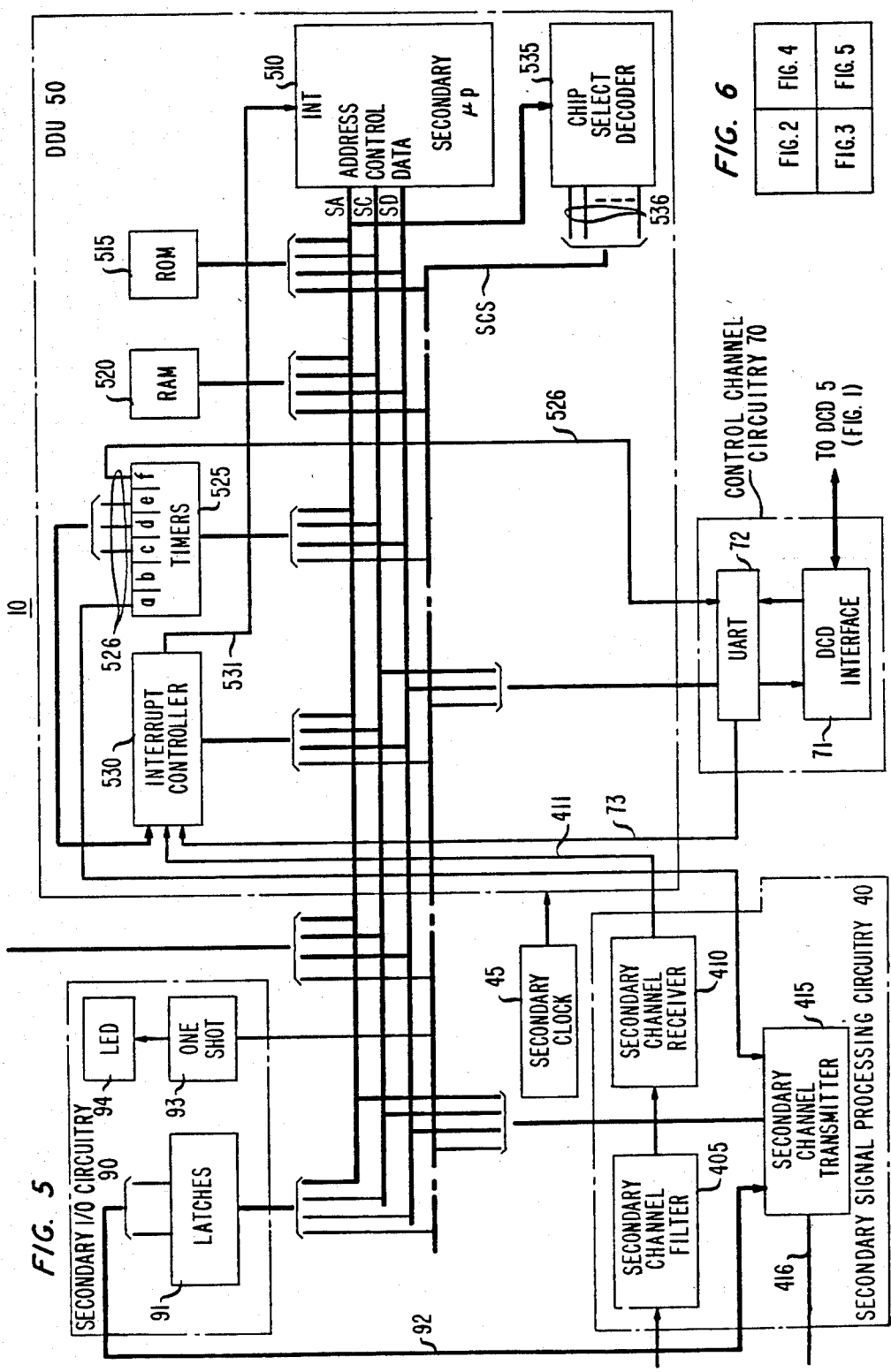

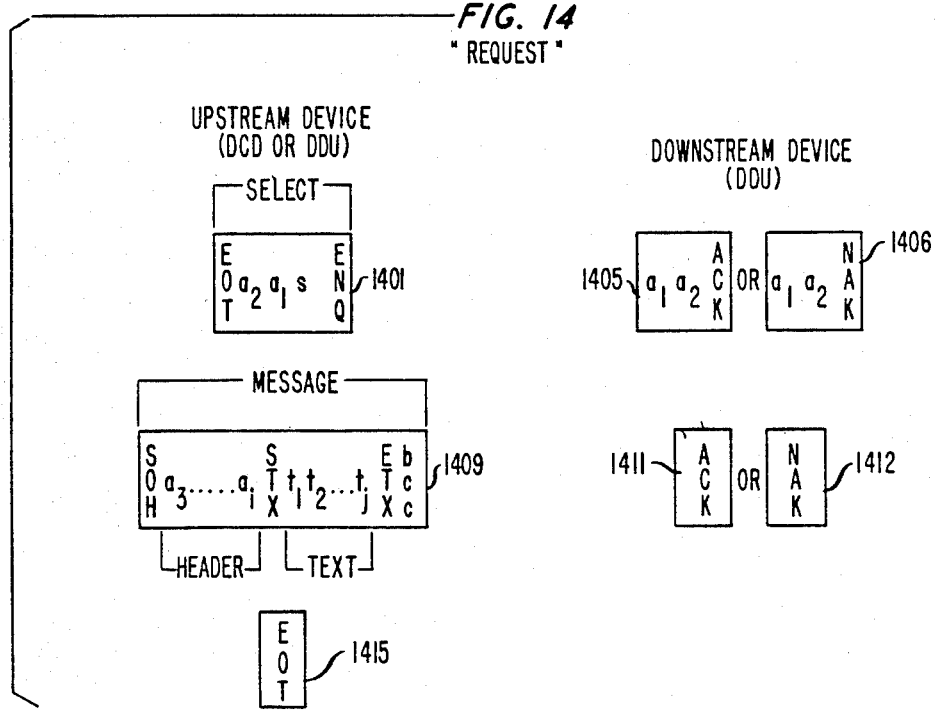
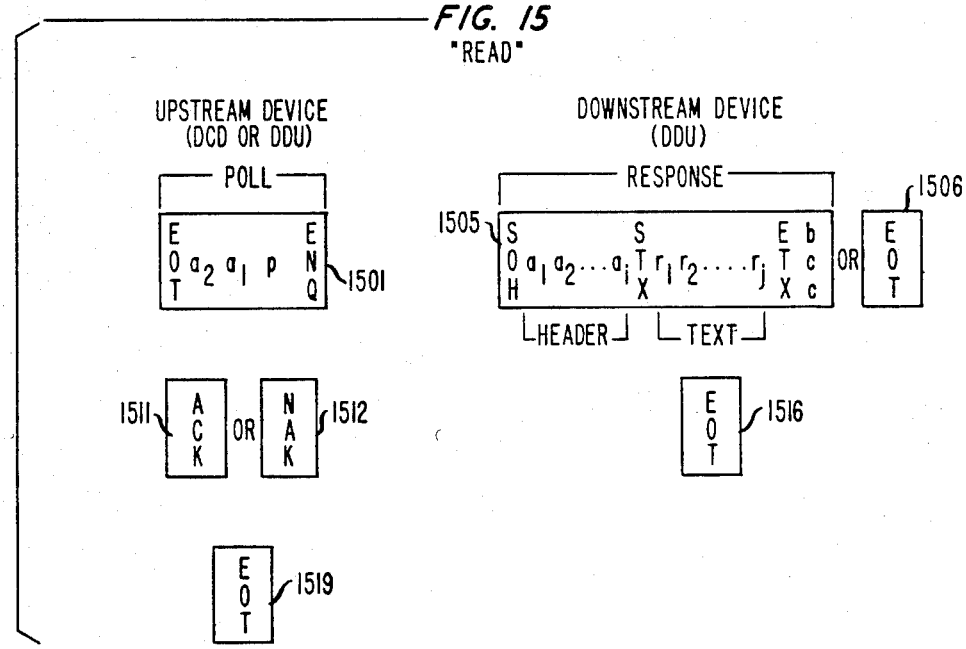

FIG. 16 CONTROL DATA SET-DCD PORT
TRIBUTARY DATA SETS-SC PORT

| FIG. 16 |
| FIG. 17 |

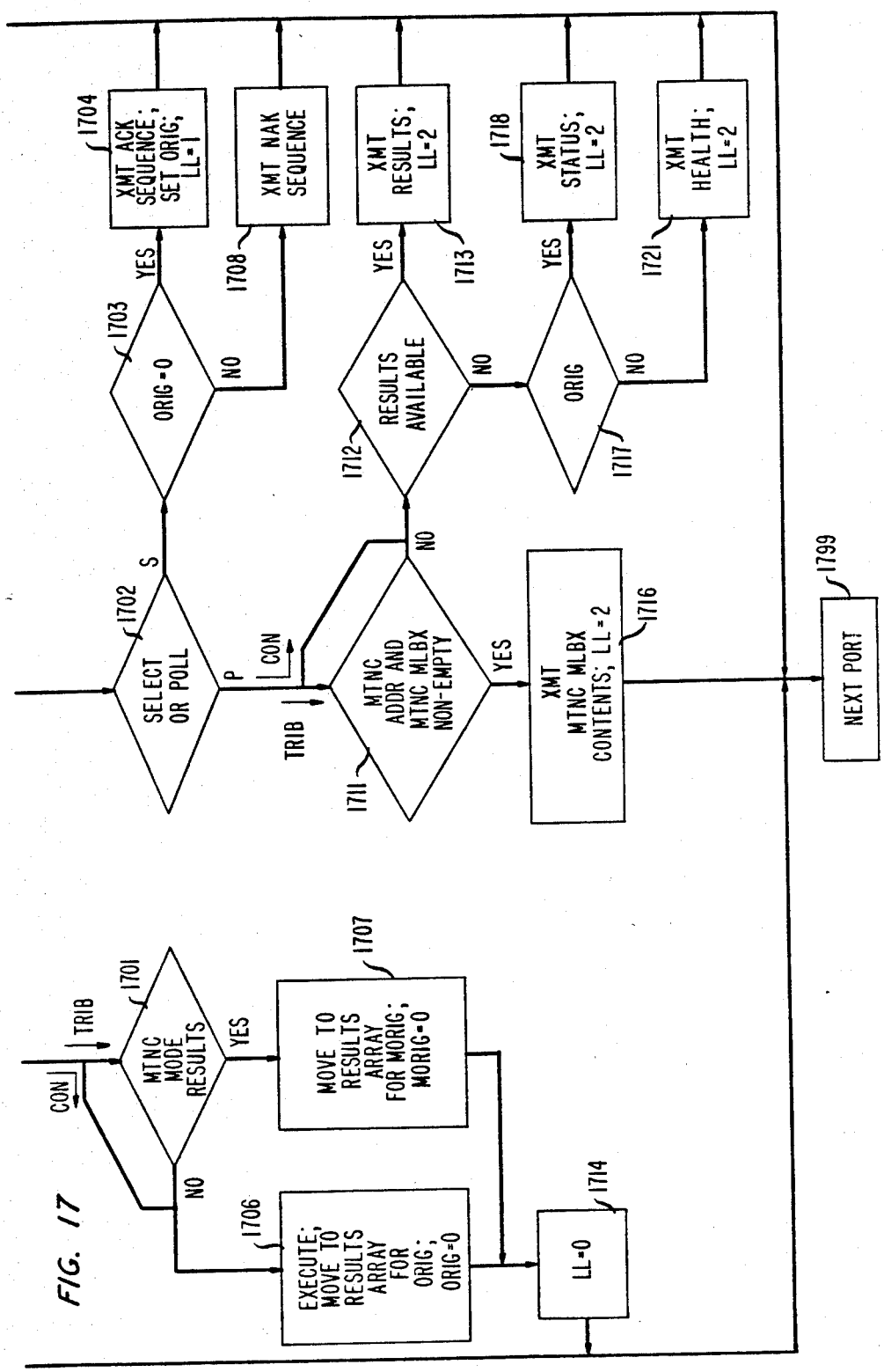

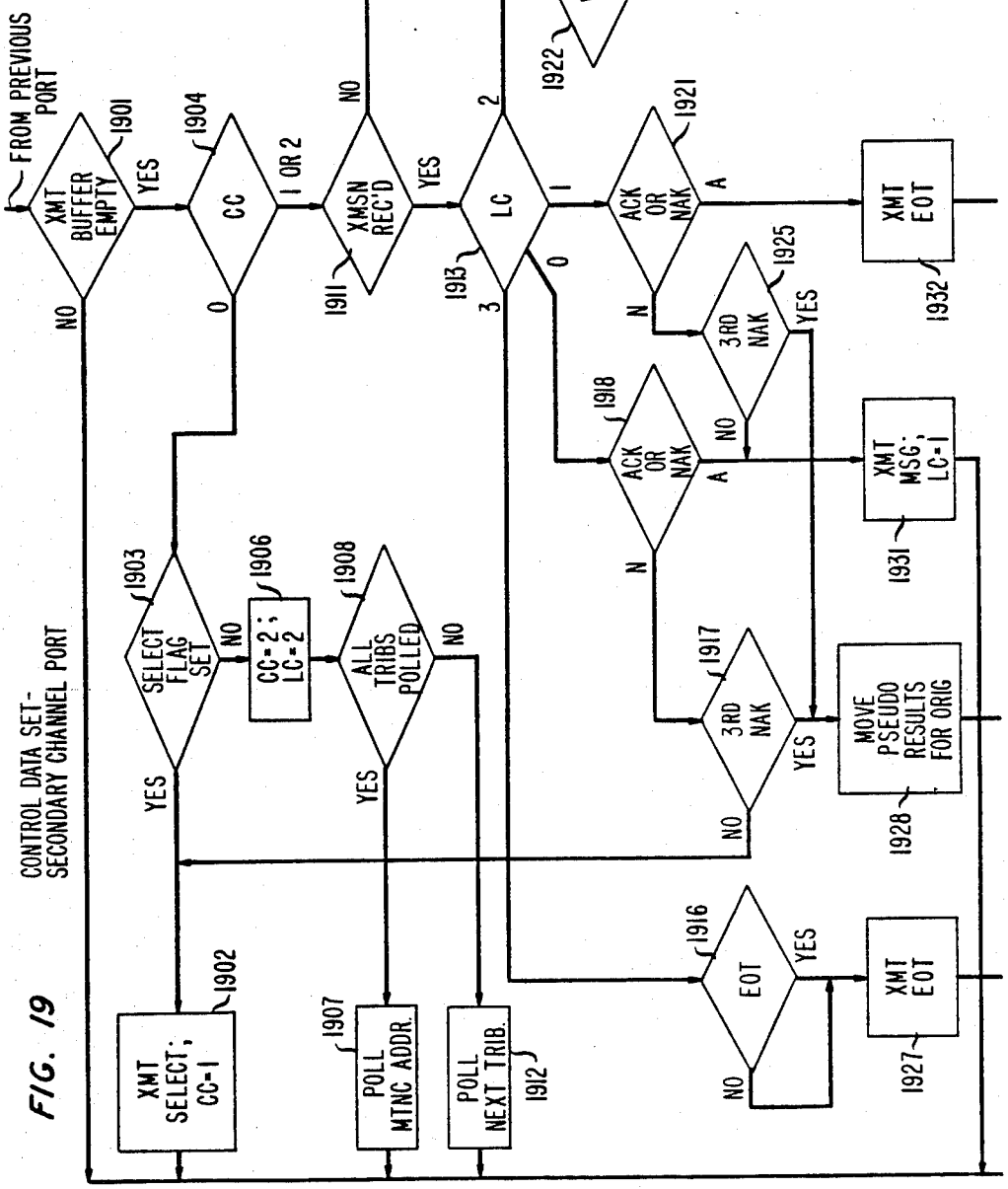

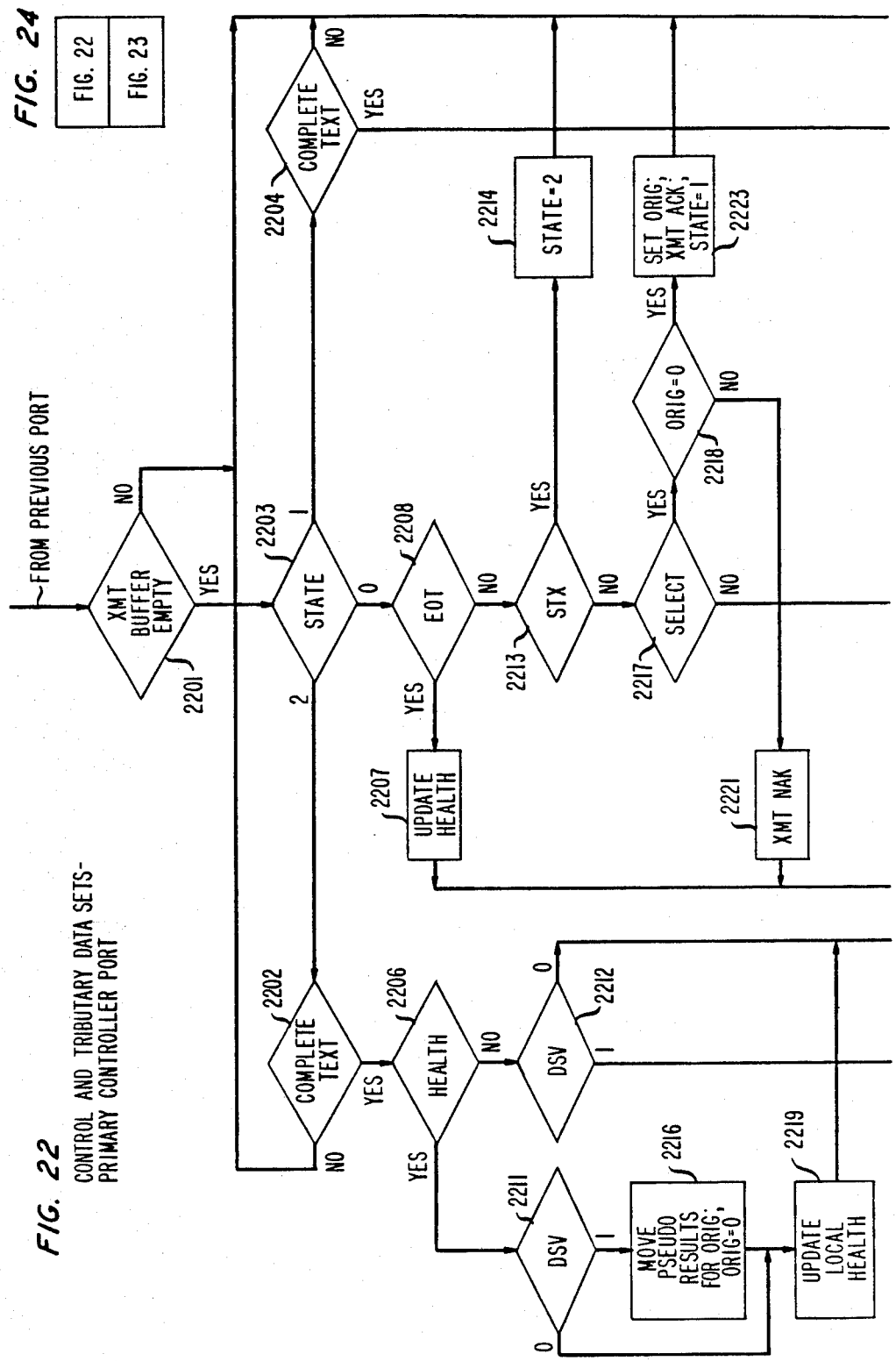

DATA SET DIAGNOSTIC SYSTEM

This is a division of application Ser. No. 196,157, filed Oct. 10, 1980, U.S. Pat. No. 4,398,297.

BACKGROUND OF THE INVENTION

The present invention relates to data set diagnostic systems.

The communication of high-speed data over voiceband telephone lines, for example, requires the use of so-called data sets, or modems. The principal function of a data set is to modulate user-provided data into the passband of the telephone line at the transmitting end and demodulate the received data signals out of the passband at the receiving end and recover the user-provided data.

Recently, networks of data sets have been provided with so-called diagnostic capability, in which the data sets and, in some networks, separate diagnostic control devices, communicate with each other via, for example, a narrow bandwidth "secondary" channel within the passband of the telephone line. For example, a control device—such as a diagnostic control device or a control data set—may instruct a "downstream" tributary data set to perform a particular test or to change an option under which the tributary data set operates. The latter, in turn, will perform the action required and return to the upstream control device the results of the test or other indication relative to the requested action.

Typically, a data set receives all the diagnostic communications which originate upstream of it. To this end, the communication of diagnostic signals over more than one communication link, e.g., from a diagnostic control device to a control data set to a tributary data set, is achieved by providing at each intermediate data set a direct signal path for diagnostic signals to proceed downstream. Each data set downstream of a communications originator examines address information which accompanies the "text" of the communication, e.g., the test or option change instruction itself and acts upon the text only if it is intended for that data set.

A data set diagnostic system architecture of the type described above is generally satisfactory as long as the round trip delays are small. It may be disadvantageous, however, in so-called extended networks in which the diagnostic signals (and, of course, the data signals) must pass through many intermediate data sets. Assume, for example, that a control device at one end of a large extended network transmits a text to a tributary device at the other end. The control device will not know whether the text was correctly received until it has waited for a time interval at least as long as the anticipated round trip delay, which in an extended network can be substantial. Even if the transmission problems occurred in the first link, i.e., in the signal path between the control device and the next data set along the route, the control device would have to wait for that entire time interval before concluding that there was a breakdown in communications, and only then could it initiate a retransmission. Moreover, when the control device retransmits its text, the source of the original transmission error in one link may have abated, but there may now be a problem in a second link, requiring yet another retransmission. As a result of these and other considerations, the time required to execute a particular diagnostic function can become excessive.

A further disadvantage of the above-described type of architecture, which is independent of the delays in the network diagnostic system is that since each data set in the network receives all communications originating upstream, only one diagnostic function can be performed within the network at any given time. This constitutes an inefficient use of the diagnostic facilities.

SUMMARY OF THE INVENTION

In accordance with the present invention, each intermediate data set within the diagnostic system serves not merely as a signal path, but as a message switching node. That is, each data set determines whether or not a text from an adjacent node has been received correctly and, if it has not, provides an indication of same to the source of the text, to obtain a re-transmission. Only when a text has been determined to have been received correctly at a given node will it be passed to the next node along the route. In this way, transmission errors within a given link are detected and corrected (if possible) illustrative through retransmission as soon as they occur, substantially ameliorating the transmission problems outlined above. Moreover, communications relating to the transmission of a texts are limited to devices along the route of the text, leaving the remainder of the diagnostic system free to perform other diagnostic functions.

In an illustrative embodiment of the invention, text are transmitted via two basic types of communications—requests and reads. A request, in particular, includes a select and a message. The select is a transmission in which the originator or diagnostic signal source, indicates to a device which is immediately downstream in the hierarchy that it wishes to transmit a message. The message includes a message text and may also include addressing information. The request also includes transmission from the downstream device in which it responds to the select and message. For example, it may indicate to the originator of the select that because it has previously accepted a select and not yet returned final results, it cannot accept another select at this time. Or, it may indicate that the message was not received correctly, in which case the message will be retransmitted.

A read includes a poll and a poll response. The poll is a transmission in which the originator indicates to a device which is immediately downstream in the hierarchy that it wishes to receive a text, such as the results of a test previously requested or the health and/or operating status of the downstream device and the network below it. The poll response is a transmission from the downstream device which includes the requested text. If the upstream device does not receive the poll response correctly, it provides an indication of same downstream, in which case the poll response is retransmitted.

BRIEF DESCRIPTION OF THE DRAWING

FIGS. 2-5, when arranged as shown in FIG. 6, comprise a block diagram of a voiceband data set used in the system of FIG. 1;

FIGS. 14 and 15 respectively depict the protocols for request and reads used in the diagnostic system in accordance with the invention;

FIGS. 16-17, 19-20, 22-23, when arranged as shown in FIGS. 18, 21 and 24, respectively, are flowcharts depicting the communications processing performed by the DDU of the data set of FIGS. 2-5.

DETAILED DESCRIPTION

Figure 1:
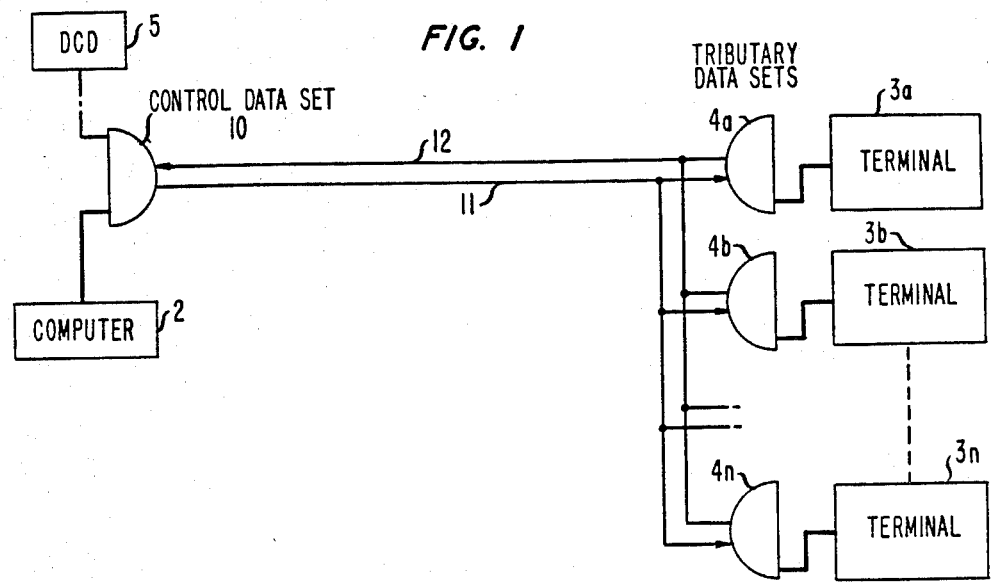
FIG. 1 is a block diagram of a voiceband data communication system in which the present invention is implemented.

FIG. 1 depicts a communication system in which the present invention is used. Although use of the invention is particularly advantageous in extended networks, such as that shown in FIG. 25, the principles of the invention will first be explained with reference to the simpler network of FIG. 1.

In FIG. 1, a computer 2 communicates on a time shared basis with a plurality of data terminals 3a, 3b, . . . 3n. A control data set, or modem, 10 is associated with computer 2. Tributary data sets 4a, 4b, . . . 4n are associated with terminals 3a, 3b, . . . 3n, respectively. Computer 2 transmits information to a particular terminal via data set 10, two-wire private line 11, and the associated one of data sets 4a, 4b, . . . 4n. A terminal transmits information to computer 2 via its associated data set, private line 12 and data set 10.

Data sets 4a, 4b, . . . 4n and 10 provide several functions. One is to correct for distortion and other channel irregularities which may cause, for example intersymbol interference. The other is to modulate the data which is to be transmitted into, and demodulate it out of, the passband of lines 11 and 12.

Figure 7:
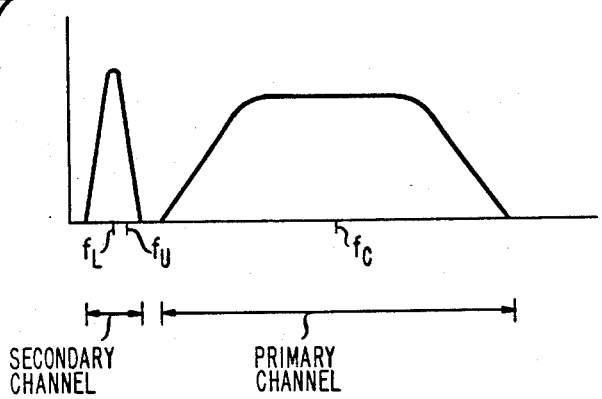
FIG. 7 shows the division of the bandwidth over which the data set operates into primary and secondary channels.

The bandwidths of lines 11 and 12 are each divided into a primary and secondary channel, as shown in FIG. 7. The primary channel carries modulated data, start-up signals and various test signals. The secondary channel carries diagnostic and control information between data set 10 and each of data sets 4a, 4b, . . . 4n. As described in detail hereinbelow, the present invention relates principally to the communications over the secondary channel.

Data sets 4a, 4b, . . . 4n and 10 are illustratively, all similar in design. By way of example, FIGS. 2-5, when arranged as shown in FIG. 6, depict data set 10.

Data set 10 includes primary and secondary circuitries which are associated with communications over the primary and secondary channels, respectively. In particular, the primary circuitry is comprised of primary signal processing circuitry 20, primary controller 30, and primary input/output (I/O) circuitry 80. Circuitry 20 performs the real-time processing of user-provided data and received data signals. As will be described in detail hereinbelow, circuitry 20 receives serial data from computer 2. This signal is scrambled, encoded and formatted. It then modulates a carrier of frequency $f_c$. The modulated transmit data signal is transmitted over the primary channel of line 11. Circuitry 20 also receives modulated data signals from the primary channel of line 12, recovers a far-end data stream therefrom and presents it to computer 2. Circuitry 20 is controlled by controller 30, which provides information to circuitry 20 as to how the latter is to perform the real-time signal processing. Controller 30 also controls primary (I/O) circuitry 80. Both circuitry 20 and controller 30 operate in response to a clock signal of approximately 1.8 MHz provided by primary master clock 25 over lead 26.

The secondary circuitry includes secondary signal processing circuitry 40, which is controlled by a controller referred to as Data set Diagnostic Unit (DDU) 50. DDU 50 operates in response to a clock signal, also of approximately 1.8 MHz, provided by secondary master clock 45. Circuitry 40 receives diagnostic and control information from DDU 50 and converts it into a 110 baud FSK signal having upper and lower frequencies $f_U$ and $f_L$. This signal is transmitted over the secondary channel of line 11. In addition, circuitry 40 receives FSK signals from the secondary channel of line 12 and presents a waveform representing the zero crossings of the received signal to DDU 50, which recovers the transmitted intelligence.

DDU 50 communicates with controller 30 via a bus interface 60—a commercially available device known as a parallel peripheral interface. It also communicates with a diagnostic control device (DCD) 5, shown in FIG. 1, via control channel circuitry 70. DDU 50 also controls secondary I/O circuitry 90.

PRIMARY CHANNEL CIRCUITRY—SYSTEM OPERATION

Primary Signal Processing and I/O Circuitry

Primary signal processing circuitry 20 interfaces with computer 2 via interface connector 17, which is compatible with EIA standard RS-449. Of the interface leads which extend from the computer, the SD (send data), TT (terminal timing), and RS (request-to-send) leads extend via cable 109 through selector 110 to encoder 115 via cable 111. (When the data set is in a digital loopback test mode, selector 110 extends to encoder 115 the signals on cable 177 rather than the signals on cable 109.)

The transmitter portion of circuitry 20 is principally comprised of encoder 115, modulator 120 and D/A converter 125.

Encoder 115 is a large scale integrated (LSI) circuit which processes the input data from the SD lead in preparation for modulation. This processing includes, for example, the functions of scrambling and differential encoding. The encoder output signal passes over cable 116 to modulator 120—another LSI circuit.

The modulator output on cable 121 is a sequence of digital words representing samples of the PSK modulated signal to be transmitted. These are passed to D/A converter 125. The analog output of the latter on lead 126 is passed through a pad 130 and released transfer contact AL-1 of an analog loopback relay AL to one input of summing amplifier 15. The other input to the summing amplifier is the output of secondary channel transmitter 415 within secondary signal processing circuitry 40. The output of summing amplifier 15 is shaped by a transmit low pass filter 14 whence it passes to a compromise equalizer 13. The latter conditions the outgoing signal to compensate for some of the expected channel degradation. The output of equalizer 13 is extended to line 11.

The received data signal from line 12 is brought into the data set through preamplifier 16. The output of the preamplifier extends to secondary channel processing circuitry 40, as discussed more fully below. The output of preamplifier 16 also extends through released transfer contact AL-2 to the receiver portion of circuitry 20.

In particular, the preamplifier output extends to primary channel receive filter 150. Filter 150 removes the secondary channel signal, passing the primary channel signal to an automatic gain control (AGC) circuit 155. The latter sets the correct levels for proper operation of the circuitry which follows.

In particular, the AGC output passes to phase splitter/timing recovery circuit 160 over lead 156. The timing recovery portion of circuit 160 generates a square wave having transitions which correspond to zero crossings of a baud rate tone extracted from the AGC output signal. This square wave is extended to receiver processing and equalization circuit 170 over lead 162 where it is used to control receiver timing. The phase splitter portion of circuit 160 generates a Hilbert transform signal pair on cable 161 in response to the AGC output signal. The Hilbert transform pair is extended to A/D converter 165 which generates digital versions of the Hilbert transform signals one after the other in serial form on a lead within cable 166.

Cable 166 extends to receiver processing and equalization circuit 170, which is comprised of several LSI circuits. Circuit 170 performs such functions as adaptive equalization, demodulation and data decision formation. It presents (presumably correct) decisions as to the values of transmitted data symbols to decoder 175 over cable 171. It also extends a digital word to AGC 155 over cable 172 specifying the AGC gain. Cable 172 also carries clock signals for AGC 155. Clock signals are also extended to A/D converter 165 over cable 167.

Decoder 175, another LSI circuit, performs the inverse functions of encoder 115, e.g., differential decoding and de-scrambling. Receive timing and receiver ready signals generated by decoder 175 on leads 174 and 182 are respectively extended to the ones of EIA drivers 185 associated with the RT and RR leads of interface connector 17 via cable 178. In normal operation the RD (receive data) lead of connector 17, carrying the recovered far-end data, also receives its signal via one of drivers 185 from decoder 175. This signal is routed to the driver via decoder output lead 176, cable 177, selector 110 and lead 112. The ST (send timing) lead of connector 17 receives its signal from encoder 115 via lead 117 and another one of EIA drivers 185.

In addition to the receive data signal on lead 176, cable 177 carries the receive timing and receiver ready signals from cable 178. During digital loopback tests, the signals on cable 177, rather than the signals on cable 109, are extended by selector 110 to encoder 115, and selector 110 extends ground potential to the one of EIA drivers 185 associated with the RD lead of connector 17.

Other leads of connector 17 include SB (standby), DM (data mode), CS (clear to send), TM (test mode) and SQ (signal quality). These signals are provided by respective ones of EIA drivers 190 via latches 180 and leads 181. (Another one of latches 180 provides a signal to selector 110 via lead 182 indicating whether the data set is to be in the normal or digital loopback mode.)

Figure 8:
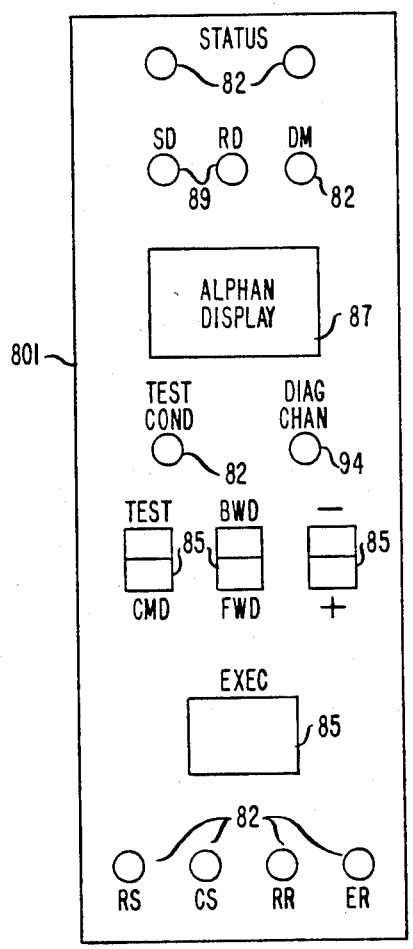
FIG. 8 depicts the front panel of the data set.

Primary I/O circuitry 80 includes a set of latches 81. Individual ones of latches 81 control the states of LED indicators 82 disposed on front panel 801 of the data set, which is shown in FIG. 8. The two status indicators are red and green, respectively. The green indicator is on when both data set 10 and tributaries 4a, 4b, . . . 4n are operating normally; otherwise, the red indicator is on. The DM (data mode) indicator is on if the data set is available to carry user-provided data, as opposed to being in a test condition. The TEST CONDition indicator is on when a test which is disruptive of normal communications over the primary channel is in progress. (The DM and TM leads of interface 17 are raised when these indicators are on.) The RS, CS and RR indicators show the state of the corresponding EIA interface leads. The ER indicator is on when data set equalizer is in a retrain mode. (SD and RD indicators 89 of panel 701 are driven directly from the corresponding EIA interface leads via buffers not shown. Diagnostic channel indicator 94 is controlled by secondary channel circuitry.)

Other ones of latches 81 control various relays in the data set, such as analog loopback relay and a select standby relay SR.

I/O circuitry 80 also includes a set of buffers 84 through which the positions of various front panel switches 85 can be read. These are operated by the user to issue commands to the data set and to request that it perform various tests on itself and/or the network to which it is connected. Other ones of switches 85 (not shown in the drawing) define a local address for the data set. When a diagnostic control device (DCD) 5 is associated with a number of co-located data sets, this local address provides the DCD with a way of directing its communications to data set 10. In addition, signals from bus interface 60 can also be read through ones of buffers 84.

I/O circuitry 80 also includes a four-character alphanumeric display 87. When data set or network faults are detected, the display is used to indicate their nature to the user. In addition, the data set uses display 87 to present mnemonics for the tests and commands which the user can order the data set to execute. It also uses the display to present test results, for example, in the form of a word (PASS) or a measurement (03DB).

Primary Controller

Primary controller 30 includes a microprocessor 310 and associated peripherals including read only memory (ROM) 315, random access memory (RAM) 320, timer circuitry 325, interrupt controller 330 and chip select decoder 335. Controller 30 communicates with its peripherals and the rest of the data set by writing information into, and reading information out of, registers, buffers and/or latches throughout the data set. This communication is carried out via three buses—primary address bus PA, primary control bus PC, primary data bus PD—and a primary chip select cable PCS.

The leads 336 of cable PCS are derived by chip select decoder 335 from a subset of the address bus leads. The leads of cable PCS extend to various integrated circuit chips or groups of chips (e.g., ROM 315) within the data set. When it is desired to communicate with a particular device, i.e., register, buffer or latch, microprocessor 310 provides on bus PA an address unique thereto. Decoder 335 provides a signal on an appropriate one of leads 336 indicating that the controller wishes to communicate with the device in question. If more than one device is associated with a particular chip select lead, the particular circuit desired to be communicated with is identified by an address on bus PA.

Data bus PD is a bidirectional 8-bit bus over which the information itself is carried. Control bus is a two-bit bus having a read lead and a write lead. Activation of the write lead means that information provided on bus PD is to be written in a register or latch which has been addressed. Activation of the read lead means that information is to be provided on bus PD by the register or buffer which has been addressed.

Not all leads of all buses extend to each circuit with which controller 30 communicates. For example, latches (buffers) receive only the write (read) lead of the control bus. In addition, the various integrated circuits comprising the data set may receive less than the full number of address leads, depending on the number of addressable elements contained therein.

Some of the functional blocks shown in FIGS. 2–5, e.g., latches 81 and bus interface 60, receive more than one chip select lead, as indicated by a cable, rather than a lead, tap off of chip select cable PSC. Buffers used to drive the three buses cable PSC are not shown in the drawing.

Figures 9, 10, 11:
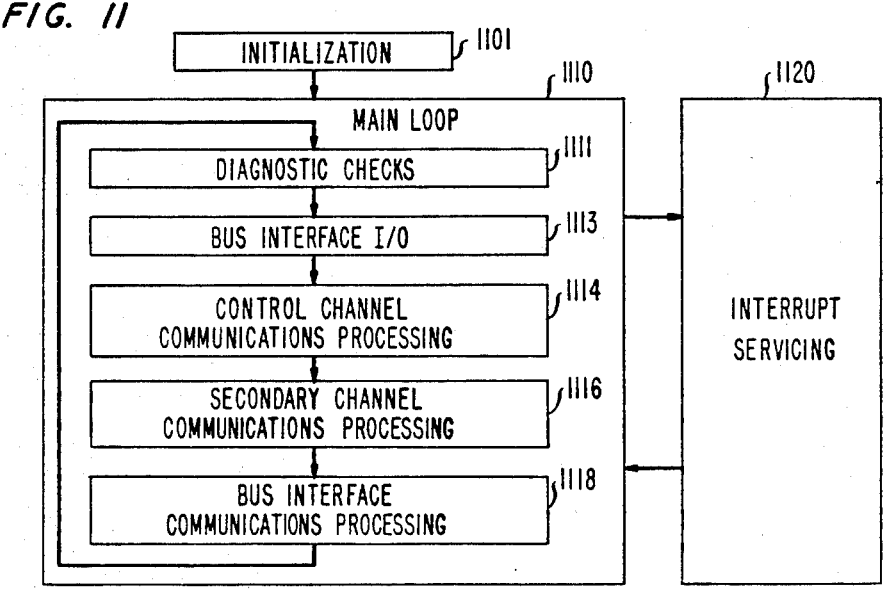
FIG. 9 is a flowchart of the overall operation of a primary controller with the data set of FIGS. 2-5.
FIG. 10 shows the contents of a read only memory within a data set diagnostic unit (DDU) which is, in turn, within the data set of FIGS. 2-5.
FIG. 11 is a flowchart of the overall operation of the DDU.

The overall operations of controller 30 is depicted in FIG. 9. Firstly, controller 30 initializes itself and the rest of the data set. It then enters a background loop in which it repetitively performs a number of predetermined background "tasks" related to the management and monitoring of off-line data set operations and the monitoring of both off-line and real-time operations. (One pass through the background loop requires about 15 ms.) Operations of the controller which relate to the control of the real-time signal processing (as well as some other operations) are handled on an interrupt basis. Interrupts are generated, for example, in response to various signal events within circuitry 20. As a particular example, an interrupt is generated by encoder 115 when the RS (request-to-send) lead is raised by computer 2. The reception of an interrupt causes controller 30 to suspend its execution of the background loop and to service the interrupt via an appropriate interrupt service routine.

The interrupt service routine causes controller 30 to write into respective registers of circuitry 20 various operating mode, operating parameter and/or signal format information signal values appropriate to the type of interrupt generated. For example, in the case of an interrupt generated by a raising of the RS lead, controller 30 performs operations such as configuring encoder 115 for start-up, turning on modulator 120, loading (jamming) ideal reference (start-up) data into encoder 115, configuring encoder 115 for normal operations, and raising the CS (clear-to-send) lead.

Once an interrupt service routine (or any phase thereof which is separated from the following phase by a significant time interval) is completed, controller 30 returns to the background loop at the place where it left.

Primary Controller
Operation—Initialization/Background Loop

Controller 30 is controlled by a set of initialization routines in ROM 315 when power is applied to the data set. During initialization, various pointers within the microprocessor are set and various registers within the microprocessor are cleared. Latches, such as latches 180, are set to predetermined (e.g., cleared) states. In addition, numerous operating mode signals held in registers within the data set—principally within circuitry 20—are set to predetermined initial values. These include, for example, a signal which specifies the state (on or off) of the modulator, signals which specify the signal sources for the encoder and decoder, signals which specify various operating modes for the equalizer, etc.

A further initialization function is to specify various operating parameter values and signal processing formats for the LSI circuits of circuitry 20. Although data set 10 operates with an 8-phase PSK having predetermined differential encoding and scrambling, predetermined carrier frequency, predetermined start-up protocols, etc., circuitry 20 is capable of operating in accordance with various operating parameters and signal processing formats. For example, modulator 120 is capable of implementing (a) phase shift keying (PSK) using 100 percent excess bandwidth at 1200 baud, (b) PSK using 50 percent excess bandwidth at 1600 baud and (c) quadrature amplitude modulation (QAM) using 12 percent excess bandwidth at 2400 baud. It can operate over a wide range of carrier frequency. Encoder 115 is capable of implementing any of a number of scrambling and differential encoding algorithms and QAM signal constellations. Receiver processing and equalization circuit 170 and decoder 175 are similarly flexible.

At this time, then, the encoder and decoder receive information as to the scrambling/descrambling and differential encoding/decoding algorithms to be initially used, i.e., during transmitter and receiver start-up. These may be changed later as, for example, when transition is made from transmitter start-up to normal transmitter operation. Modulator 120 and receiver processing and equalization circuit 170 receive information as to which of the three above-mentioned modulation formats are to be used and also what the carrier frequency is.

Various random access memories are also loaded during initialization. These include random access memories within encoder 115 and decoder 175 which hold microcoded program instructions under the control of which the encoder and decoder operate. Also initialized are all of the numerous variables stored in RAM 320.

When initialization is complete, the controller enters the background loop and sequentially performs the above-mentioned background tasks.

For example, in a so-called background diagnostic task, controller 30 reads an ID word stored in a particular register in each of the LSI circuits of circuitry 20. The value of each ID word, as read, is compared to the known value thereof stored in ROM 315. The ability of controller 30 to retrieve the proper ID word from each LSI circuit is a good indication that at least a considerable portion of the controller 30 bus structure is functioning properly. It is also one indication that the LSI circuits are themselves operational and that the proper LSI circuit was inserted in the proper place during data set manufacture. The background diagnostic task may also include other checks on the integrity of the data set circuitry. Upon failure of any of these diagnostic checks, the background diagnostic task sets a flag in a data set health word stored in RAM. Through the operation of other tasks, the finding of a fault and the resulting setting of an appropriate flag in the health word causes front panel status indicators 82 to switch to red on/green off and a mnemonic for the fault is presented on display 87.

Another task is a modern operational task, which is principally comprised of a number of so-called consistency checks. For example, the state of the RS (requestto-send) lead, which can be read from encoder 115, is compared with a transmitter status word within RAM 320. The transmitter status word indicates whether the transmitter circuitry is, for example, off, on, in start-up, or in turn-off. If the RS lead and transmitter status word are inconsistent, the controller initiates a transmitter turn-on or turn-off in accordance with the RS lead signal. The modem operational task also performs a streaming check if the data set has been optioned for same. In accordance with this check, the time over which the RS lead remains high is monitored. If it exceeds a predetermined value, the modulator is turned off and, again, a flag is set in the data set health word, ultimately resulting in an indication of the fault on front panel 801.

A set of tasks referred to as the EIA tasks involve the monitoring of various leads to which the data set is connected. One EIA task monitors the status of various leads of EIA interface connector 17 and upon detecting transitions, takes appropriate action. For example, upon detecting via one of EIA buffers 105 that the LL (local loopback) or RL (remote loopback) lead has been raised by the user's terminal equipment, this EIA task initiates the relevant test. Similarly, upon detecting via another one of buffers 105 that the SS (select standby) lead has been raised, this task causes relay SR to close. The resulting closure of relay contact SR indicates to back-up circuitry associated with data set 10 that the latter is to be connected to a back-up transmission channel. The SB lead is raised once the back-up channel is in use.

So-called communication control tasks relate to communications between the data set and the user, including, for example, the scanning of switches 85, activation of status indicators 82 and the control of display 87. Another communication control task oversees the running of data set and network tests.

Primary Controller Operation—Interrupts

As previously mentioned, execution of the background loop continues indefinitely until controller 30 receives an interrupt. Within the controller, interrupts are received by microprocessor 310 via lead 311. Interrupts originate from several places within circuitry 20 and are generated in response to various signal events within that circuitry. The previously mentioned request-to-send interrupt, for example, is generated by encoder 115 on lead 118 when computer 2 raises or lowers the RS lead. Receiver processing and equalization circuit 170 generates an energy detect (COV) interrupt on lead 173 when signal energy appears on, or disappears from, cable 166. Decoder 175 generates a word trap match interrupt on lead 177 when a particular received data word, such as a synchronization word, is determined to have been received.

In addition, interrupts are generated on leads 326 by respective ones of three timers 325a, 325b and 325c within timer circuitry 325. Timers 325a and 325b are used principally in connection with transmitter and receiver operations, respectively. Timer 325c is a general purpose timer.

When microprocessor 310 receives an interrupt from interrupt controller 330 over lead 331, it determines the source of the interrupt by interrogating interrupt controller 330 and then transfers control to an appropriate interrupt service routine within ROM 315.

SECONDARY CIRCUITRY

Structure and Overall Operations

As previously indicated, the secondary circuitry is controlled by Data set Diagnostic Unit (DDU) 50. DDU 50 is structured similarly to controller 30. In includes a microprocessor 510, ROM 515, RAM 520, timer circuitry 525, interrupt controller 530 and chip select decoder 535. DDU 50 communicates with its peripherals and the rest of the secondary circuitry—secondary signal processing circuitry 40, control channel circuitry 70 and secondary I/O circuitry 90—via secondary address but SA, control bus SC, data bus SD and chip select cable SCS. The latter is comprised of the output leads 536 of decoder 535.

Secondary signal processing circuitry 40, as previously noted, received the output of preamplifier 16. Within circuitry 40, the preamplifier output signal is received by secondary channel filter 405 which removes the primary channel receive signal and passes the FSK secondary channel receive signal to receiver 410. The latter provides an output pulse on lead 411 in response to each zero crossing of the FSK signal. These zero crossing indications are extended via interrupt controller 530 and interrupt lead 531 to microprocessor 510, which recovers the secondary channel intelligence, as described more fully hereinbelow.

Secondary channel transmitter 415 receives from DDU 50 information to be transmitted over the secondary channel. Transmitter 415 is illustratively an FSK transmitter which implements the inventions disclosed in U.S. Pat. Nos. 4,170,764 issued Oct. 9, 1979, to J. Salz et al and 3,801,807 issued Apr. 2, 1974 to J. Condon. The output of transmitter 415 passes to adder 15 via lead 416. Signals from which the frequencies of the two FSK tones are derived are provided to transmitter 415 from timer 525a, operating in a divide-by-N mode, via one of leads 526. Also operating in a divide-by-N mode is timer 525c, the interrupts of which define a 110 baud clock for the secondary channel.

Secondary I/O circuit 90 includes a pair of latches 91, one-shot 93 and LED 94. The outputs of latches 91 extend to transmitter 415 over cable 92. One of these latch outputs turns transmitter 415 on and off. The other latch output determines which of two predetermined amplitudes the tone currently being transmitted by transmitter 415 is to have; as described in the Salz et al patent, the higher frequency tone has a smaller amplitude than the lower frequency tone. One-shot 93 is pulsed periodically (e.g., at 1 Hz) by DDU 50 whenever a message has been successfully transmitted or received on the secondary channel. This causes a blinking of diagnostic channel indicator 94 on front panel 801.

Tests and commands can be initiated by the user not only from front panel 801 (FIG. 8), but via diagnostic control device (DCD) 5 (FIG. 1). The DCD communicates with DDU 50 asynchronously via control channel circuitry 70. The latter includes a DCD interface 71 and universal asynchronous receiver and transmitter (UART) 72 which formats and de-formats the asynchronous data. The contents of ROM 515 are shown in FIG. 10. This FIG. is described hereinbelow.

The overall operation of DDU 50 is depicted in FIG. 11. Firstly, as indicated at 1101, DDU 50 initializes itself and the rest of the secondary channel circuitry, similar to the initialization performed by controller 30. For example, interrupt controller 530 is initialized to define, for example, interrupt priorities. In addition, interrupt source identifier words are loaded into interrupt controller 530 so that the latter will be able to identify to DDU 50 via bus SD where a particular interrupt originated. (Although not stated hereinabove, interrupt controller 330 is similarly initialized.) UART 72 is initialized to select such options as the number of start and stop bits it will use in formatting characters. Bus interface 60 is configured to have a desired mode of input/output (I/O) operation (as described below) and flags indicating whether character buffers within interface 60 are full or empty are set to indicate the latter. Latches 91 are reset.

Figure 12:
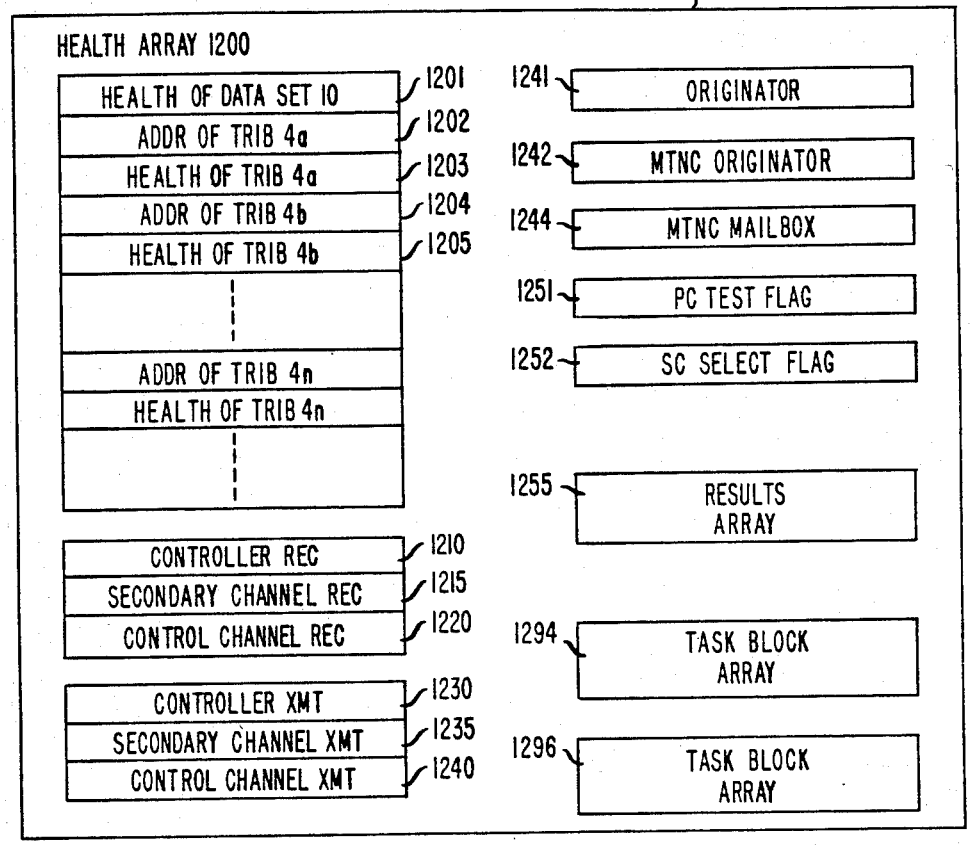
FIG. 12 shows a portion of the contents of a random access memory within the DDU.

In addition, various ones of timers 525 are initialized. For example, timer 525a is initialized to provide signals on lead 526 from which transmitter 425 derives the frequencies of the two FSK tones. Timers 525d and 525e are initialized to provide respective 9 ms interrupts discussed below. Timer 525f is initialized to provide a clock for UART 72. Also initialized are the many variables, buffers, arrays, pointers etc., stored in RAM 520, a number of which are shown in FIG. 12 and are discussed below.

When initialization is complete, DDU 50 enters a main loop 1110 comprised of diagnostic checks 1111, bus interface I/O (input/output) 1113, control channel communications processing 1114, secondary channel communications processing 1116 and bus interface communications processing 1118. Execution of the main loop is suspended to service various types of interrupts, indicated at 1120.

(Also included in the main loop, although not explicitly shown in FIG. 11 is the resetting of a so-called sanity count. In particular, this count is reset to a predetermined value—illustratively 64—in each pass through the main loop. This count is decremented by an interrupt service routine which is invoked every 9 ms in response to the above-mentioned interrupt generated by timer 525d. If the DDU is operating properly, the sanity count should never reach zero because one pass through the main loop should always take less than $9 \times 64 = 576$ ms. If the sanity count does ever reach zero, it is assumed that something is awry and the interrupt service routine will initiate a reset of the DDU, i.e., re-execution of the DDU initialization rountines. (A similar sanity count is maintained in controller 30.))

Diagnostic checks 1111 within main loop 1110 include, for example, ROM and RAM checks similar to those performed by controller 30. Upon failure of any of these checks, a flag is set in a data set health word 1201 in DDU RAM 520. The information in health word 1201 and health words associated with tributaries 4a, 4b . . . 4n is periodically requested by controller 30.

Bus interface I/O 113 is the process by which information is read from and written into interface 60. In particular, the DDU examines a DDU receive flag within interface 60. If the flag is set, this means that a character has been written into the interface by controller 30. DDU 50 reads the character and stores it in a controller receive buffer 1210 within RAM 520. The reading of the character causes the interface to reset the DDU receive flag, which is read by controller 30 in its background loop. When the flag is found to be reset, this indicates to controller 30 that it can write another character into the interface.

DDU 50 also examines a DDU transmit flag within interface 60. If this flag is reset, and if there are any characters for controller 30 waiting in a controller transmit buffer 1230, DDU 50 writes the next character to be transmitted into the interface. This causes the latter to set the DDU transmit flag. Controller 30 reads this flag in its background loop, also, and upon finding it set, reads the character. As before, reading of the character automatically resets the flag.

Input/output for secondary channel circuitry 40 and control channel circuitry 70 is carried out in response to interrupts. It is convenient to describe these I/O functions at this point, before continuing with a description of the main loop.

UART 72 issues an interrupt on lead 73 when it has received a complete character from DCD 5, invoking an interrupt service routine which reads the character from the UART and stores it in a control channel receive buffer 1220 within RAM 520. In addition, microprocessor 510 responds to interrupts which issue from timer 525e every 9 ms. As each interrupt occurs, the associated interrupt service routine determines whether there are any characters in a control channel transmit buffer 1240 waiting to be transmitted. If there are, the microprocessor then inspects a flag in UART 72 to determine whether the UART is capable of receiving a character or whether it is in the process of transmitting a previous character and thus cannot receive a new character. If the former is the case, the new character is read into the UART. If the latter, control is returned to the main loop.

Turning now to secondary channel circuitry 40, receiver 410 issues an interrupt for each zero crossing of the received FSK carrier. Each such interrupt invokes an interrupt service routine which utilizes a count in timer 525b, read over bus SD, to measure the time intervals between successive zero crossings, thereby to recover the "1" s and "0"s represented by the FSK signal. Once this interrupt service routine determines that a complete character has been received, it writes that character into a secondary channel receive buffer 1215.

above-mentioned sanity interrupts which issue every 9 ms from timer 525d. As each interrupt occurs, the associated interrupt routine, as in the case of UART 72, determines whether there are any characters in a secondary channel transmit buffer 1235 waiting to be transmitted. If there are, the routine determines whether a previous character is still in the process of being transmitted. If so, return is made to the main loop. If not, transmission of the next character is initiated.

Attention is redirected to main loop 1110. Control channel communications processing 1114 relates to (a) the processing of transmissions received from DCD 5 once they have been stored in buffer 1220 and (b) the generation of transmissions for DCD 5 and the storing of same in buffer 1240. Secondary channel communications processing 1116 relates to (a) the processing of transmissions from tributary data sets 4a, 4b . . . 4n once they have been stored in buffer 1215 and (b) the generation of transmissions for those tributaries and the storing of same in buffer 1235. Similary, bus interface communications processing 1118 relates to (a) the processing of transmissions received from controller 30 once they have been stored in buffer 1210 and (b) the generation of transmissions for the controller and the storing of same in buffer 1230. The manner in which these functions are performed is the subject of most of the remainder of this description, beginning now with a description of the communications protocol.

Communications Protocol

Figure 13:
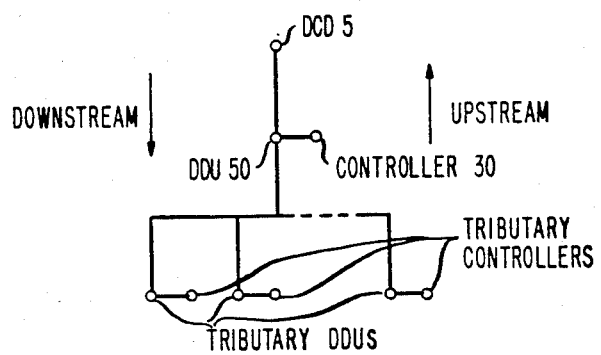
FIG. 13 depicts the hierarchy of the diagnostic system of the network of FIG. 1.
Figure 18:
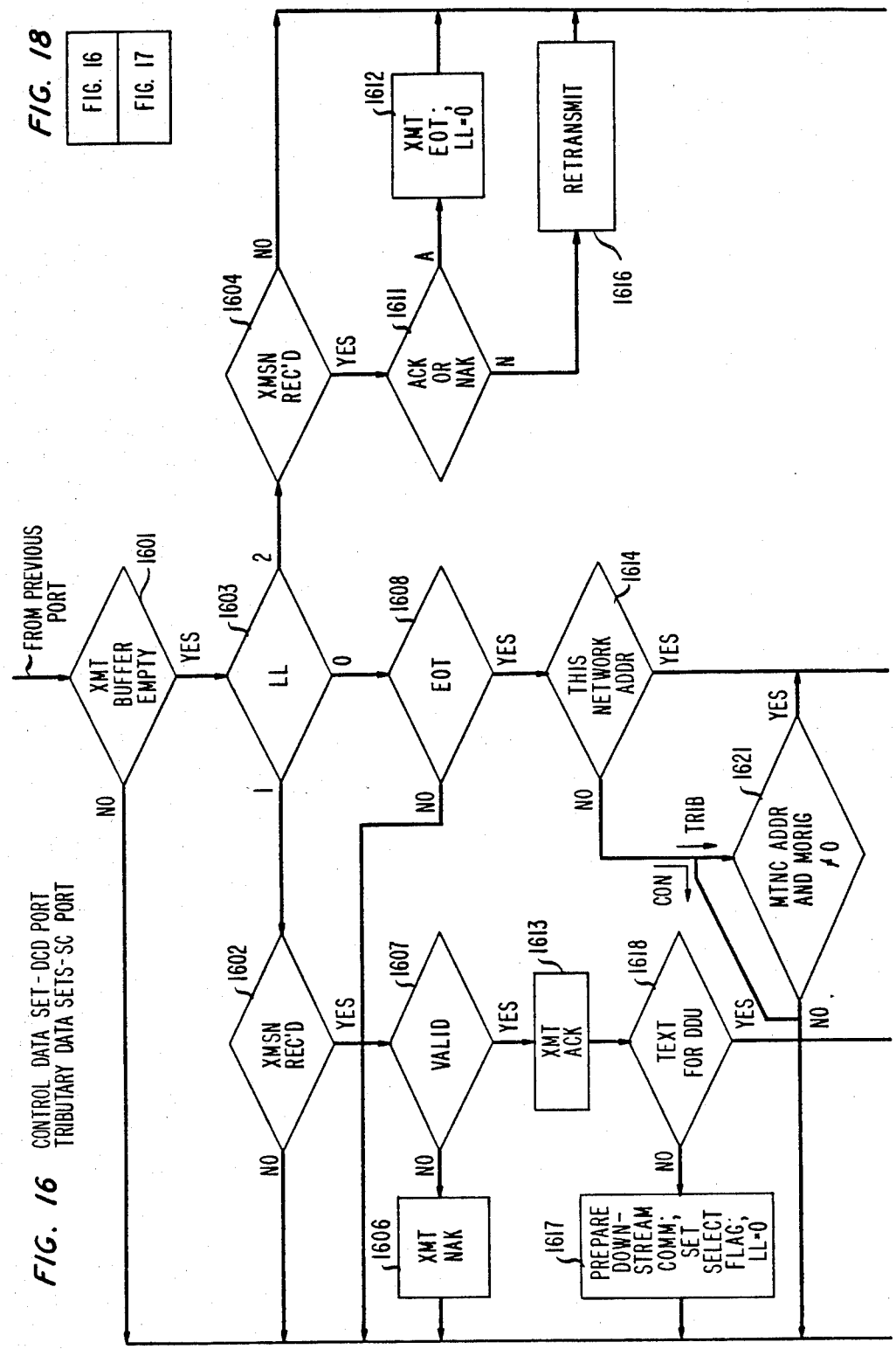

The various components of the network of FIG. 1 which originate or handle diagnostic and control information—referred to collectively as the network diagnostic system—communicate in a hierarchy. As shown in FIG. 13, diagnostic control device (DCD) 5 is at the head of the hierarchy and is thus above DDU 50. Primary controller 30 is above DDU 50 for some functions and below it for others, as described below. Controller 30 is also below DCD 5. The DDUs of tributary data sets 4a, 4b . . . 4n are, again, each either above or below their respective primary controllers, depending on the functions being performed and are also below DDU 50. A device within the network diagnostic system, i.e., the DCD, a DDU or a primary controller, which is higher (lower) in the hierarchy than another is said to be upstream (downstream) of that other.

In accordance with the present invention, communications are carried out in the network diagnostic system on a link-by-link basis, with the DDUs serving as message switching nodes. In particular, each device communicates directly only with devices immediately adjacent in the hierarchy. Thus in the network of FIG. 1, DCD 5 communicates directly only with DDU 50. The latter communicates directly only with DCD 5, controller 30 and the DDUs of tributaries 4a, 4b . . . 4n. The latter communicate only with DDU 50 and their respective primary controllers. In accordance with the above-metioned mentioned switching function, each DDU determines whether or not a text from an adjacent node has been received correctly and, if it has not, provides an indication of same to the source of the text to obtain a re-transmission. Only when a text is determined to have been received correctly at a given node will it be passed to the next node along the route.

Communications within the network diagnostic system are illustratively of two basic types—requests and reads. At the heart of a request is a message text for a particular downstream device. The message text may be, for example, an instruction to perform a specified test or to execute a specified command. Typical tests involve the transmission of pseudo-random words or test messages, either between two data sets on the primary channel or from a data set to itself, and observation of the transmission errors, if any. A typical command is for a specified data set in the network to disable itself—effectively removing it from the network—or to undisable itself. Another is a command for a control data set to add a tributary data set to its so-called poll list. Or the message text may contain set-up or tear-down instructions relative to a test. Message texts to be communicated between devices which are not adjacent in the hierarchy are embodied in a new request by each DDU along the route for transmission downstream.

At the heart of a read is a poll response text in which a DDU, in response to an initiation of the read from upstream, reports upstream (a) the results or status of a test or command previously requested or (b) the health and/or operating status of the DDU and that portion of the network which is below it including its associated primary controller. The status of a test might be, for example, "test in progress". Results of a test may be, for example, in the form of a "pass" or "fail" indication. Results of a command may be, for example, an indication that the requested action was, in fact, done—a so-called "did it" indication. The reported health may simply be an indication that everything is operating normally or it may be a text idendifying the location and nature of a fault in the network. The reported operational status may be "status normal" or, alternatively, an indication that, for example, the reporting device is disabled or that it is in the "maintenance mode," the latter being described more fully below.

Poll response texts to be communicated between devices which are not adjacent in the hierarchy are transmitted upstream by each DDU along the route upon the initiation of a read from the upstream device.

In the present illustrative embodiment, the diagnostic signal sources which can initiate requests and reads are a DCD, a DDU or a primary controller. The protocols for requests and reads over links other than DDU/primary controller links are shown in FIGS. 14 and 15, respectively. The protocols for the DDU/primary controller links are much simpler and will be apparent from the description of the flowchart of FIGS. 22-23. As shown in FIG. 14, in particular, a request is comprised of a number of transmissions. Each transmission of a request (and of a read) is comprised of one or more ASCII characters. Transmission 1401, is referred to as a "select." A select begins with an EOT (end of transmission) character. This is followed by two address characters $a_2$ and $a_1$. Address $a_1$ is a character which, in general, specifically identifies the initiator of the request—its so-called network address. Address $a_2$ is, typically, the network or other address associated with a particular one downstream device which is to receive the select. The two addresses are followed by the character "s", which identifies this transmission as a select, and an ENQ (enquiry) character, marking the end of the select.

The downstream device, which in this embodiment is always a DDU, responds with transmission 1405 if (a) the select was received correctly and (b) the downstream DDU is able to accept the message which is to follow (of which more hereinbelow). Transmission 1405, referred to as an ACK sequence, is, in particular, comprised of addresses $a_1$ and $a_2$, in that order, and the character ACK (positive acknowledgment). Otherwise, the downnstream device responds with transmission 1406, referred to as a NAK sequence, which is comprised of $a_1$, $a_2$ and the character NAK (negative acknowledgment).

If transmission 1406 is sent, the upstream device does not continue with the request, althout it may be repeated later. If transmission 1405 is sent, however, the upstream device now transmits transmission 1409.

Transmission 1409 is referred to as the "message." It begins with an SOH (start of header) character followed by a header comprised of the network addresses $a_3, \ldots a_i$ of all control data sets along the route to the intended ultimate recipient of the text embodied in the message plus the network address $a_i$ of the ultimate recipient. The SOH and header are omitted if the data set for which the text is intended is immediately downstream of the request initiator.

The header is followed by an STX (start of text) character and the text itself. The latter is comprised of one or more characters represented in FIG. 14 as $t_1, t_2 \ldots t_j$. The text is followed by an ETX (end of text) character and a longitudinal block check character represented in FIG. 14 by a "bcc." The block check character is a function of the previous characters and is used to detect if there were transmission errors.

If the message is received incorrectly i.e., its format or block check character are incorrect, the downstream DDU responds with transmission 1412—a NAK. The upstream device will then retransmit the message unless this NAK is the third one to be received. Once the message is received correctly, the downstream DDU responds with transmission 1411—an ACK. The upstream device then transmits transmission 1415—an EOT. At this point the request is complete. The downstream DDU then inspects the message for the presence of an SOH. If it finds one, the text is intended for a device downstream, and the DDU takes action to initiate a request embodying the text downstream. If no SOH is found, the DDU examines the text itself. If the nature of the text indicates that it is intended for the DDU, the latter acts upon it. If the text is intended for the associated primary controller, the text is passed thereto.

A read takes the form shown in FIG. 15. The first downstream transmission 1501 is referred to as a "poll." It is identical to select 1401 except that the poll includes a "p" rather than an "s." The downstream DDU can respond with either of two transmissions. If the downstream DDU previously received a request, directed either to itself or to a device further downstream, it transmits transmission 1505 upstream.

Transmission 1505, referred to as a poll response, is similar in format to a message. The header includes the network address of the read initiator, $a_1$, followed by the addresses of all devices through which the poll response text has been switched, including the address $a_i$ of the device which generated the text and the address $a_2$ of the device transmitting poll response 1505.

The text may indicate that a previously received command has been executed, or it may contain test results such as PASS or FAIL. These are referred to as final results. Alternatively, the text may contain intermediate results, which are generated in the course of a test of substantial duration. Or the text may contain a status, such as "communications in progress" or "test in progress." The former means that communications to a downstream device relative to a previous request are ongoing. The latter means that the requested test is ongoing, but results are not yet available. The receipt upstream of either intermediate results or status will result in subsequent reads until final results have been transmitted upstream.

If the downstream DDU has no test results or status to report, it transmits a health/operational status message, giving the health and operational status of itself and the network which is downstream of it. If the health is "bad," i.e., a fault has been detected, or if operational status has changed, poll response 1405 is transmitted, with the text of the response indicating the fault and/or change. If health is "good" and operational status normal, the polled device transmits transmission 1506—an EOT—which may be regarded as an abbreviated poll response with the EOT serving as the text. Hereinafter, health and operational status are subsumed under the term "health."

If the upstream device does not receive either transmission 1505 or 1506 correctly, it transmits transmission 1512—a NAK—which causes the downstream DDU to retransmit the poll response. Once the upstream transmission has been correctly received, the upstream device transmits transmission 1511—an ACK. The downstream device transmits transmission 1516—an EOT. The upstream device responds with transmission 1519—another EOT—and the read is complete.

The request protocol does not permit one device to initiate a request to another which is upstream. However, in accordance with the invention disclosed in the copending, commonly-assigned U.S. patent application of D. W. Darling et al, Ser. No. 196,160, filed of even date herewith, at least one device within the network diagnostic system is provided with a way of communicating message-type texts upstream.

In particular, when an upstream device is in a position to accept a message-type text from downstream, it initiates a read in which this fact is made known downstream. In the present illustrative embodiment, for example, the poll portion of the read, referred to as a "maintenance poll," includes a special maintenance mode address in place of the usual downstream network address.

A downstream device wishing to transmit a message-type text, such as a test, responds to the maintenance poll by embodying the desired test in the text of a poll response. Such a test is referred to as a "maintenance mode test," not because the test is necessarily any different from a test which could have been requested from upstream, but because it was communicated upstream in response to the maintenance poll.

The upstream device, upon receiving the maintenance poll response, operates on the text in just the same way as it would if the text had been received from upstream. If, for example, the poll response text embodies a test, as is typical, the upstream device performs all the same steps in executing the test that it would have if the test had originated upstream. Thus, the test may not even involve the downstream device which is requesting it.

When results of a maintenance mode test are ready at the upstream device, they are transmitted downstream via a request in which the message is indicated to be the results of a maintenance mode test. In the present illustrative embodiment, for example, the select portion of the request includes the maintenance address rather than a downstream network address. The downstream device, upon recognizing the maintenance address, knows that the message text in fact embodies maintenance mode test results.

Communications Processing

As indicated in FIG. 11, and as previously noted, DDU 50 considers each of its three ports—control channel circuitry 70, secondary channel circuitry 40 and interface 60—in turn, and for each port performs appropriate communications processing. The flowcharts about to be described indicate the basics of the communications processing performed at each of these ports. They should be understood to depict the sequence of processing steps rather than structure of the program routines and functions which implement them. Appropriate such routines and functions can be readily devised by those skilled in the art from a consideration of the flowcharts.

The processing for control channel circuitry 70, in particular, is shown in the flowchart of FIGS. 16-17. As described below, this flowchart also shows processing performed by each of the tributary data sets $4a$, $4b$ . . . $4n$ at their respective secondary channel ports, and certain blocks of this flowchart pertain only to the processing performed by the tributaries. Such blocks are ignored in the present discussion, as indicated by the small arrows labeled "CON" (control). The reader may find it helpful in understanding this and the following flowcharts to refer back to FIGS. 14 and 15.

Turning now to the flowchart, it is seen that DDU 50 first determines (as indicated at 1601) if control channel transmit buffer 1240 is empty. If it is not, this means that a previously formulated transmission for DCD 5 is still in the process of being transmitted and no further action is to be taken. Accordingly, the DDU moves on to the next port, as indicated at 1799. (Hereinafter in this discussion, most of the points at which the DDU moves on to the next port are not specifically noted. They will, however, be apparent from the context and, of course, are explicitly shown in the flowchart.)

If buffer 1240 is empty, the value of a variable LL is examined, as indicated at 1603. Assume that LL=0. The DDU determines, as indicated at 1608, whether an EOT has yet appeared in receive buffer 1220. If not, no transmission which the DDU should expect has been received. If an EOT has been received, the DDU looks at the next received character. (Although not shown in the flowchart, the DDU simply moves on from any of blocks 1608, 1614 and 1702 to the next port if a new character has not yet been received.)

As indicated at 1614, the DDU determines whether the next received character is the network address of data set 10. If it is not, the DDU moves on to the next port. If it is the network address of data set 10, the DDU, after noting and storing the second address in the transmission for later use, determines, as indicated at 1702, whether the next character is a "p," identifying the transmission as a poll, or "s," identifying it as a select.

Assume it is a select. The DDU determines, as indicated at 1703, whether a variable called the originator, indicated at 1241 in FIG. 12, is zero. If it is not zero, this means that the DDU has previously received a select from DCD 5 or another device, and has not yet sent back final results. It thus is not in a position to accept another message and transmits a NAK sequence, i.e., writes a NAK sequence into transmit buffer 1240, as indicated at 1708. If, on the other hand, the originator is zero, the DDU can accept a message. Accordingly, it transmits an ACK sequence, as indicated at 1704. DDU 50 also sets the originator to identify DCD 5 as device that originated the select and, in addition, sets LL=1.

Once the DDU determines that transmit buffer 1240 is empty, i.e., the ACK sequence has been actually communicated to DCD 5, and that a complete transmission has been received, as indicated at 1602, it determines whether the transmission was a valid one. It should be a message. Accordingly, the DDU checks that the format of the transmission is, in fact, that of a message and that the block check character is correct. If the transmission is not a valid message, a NAK is transmitted, as indicated at 1606.

Once a valid message has been received, an ACK is transmitted, as indicated at 1613. Then the text of the message is examined, as indicated at 1618, to determine if it is intended for the DDU. If not, the DDU prepares the downstream communications necessary to send the text downstream. It does this by setting up one or more (up to four, in this embodiment) task blocks in RAM 520. The setting up of a task block involves writing into an area of RAM referred to as a task block array such information as the address of a function to be called, such as the function which implements the request protocol from the initiator's end, the addresses to be used in the select, and a pointer to a buffer in which the message text is stored. Two task block arrays 1294 and 1296 are explicitly shown in FIG. 12. If execution of the function identified in the first task block is to be followed by execution of a second function, as, for example, when a request is to be followed by a read for results, a pointer in the first task block is set to point to a second task block in which that second function is identified.

As further indicated at 1617, DDU 50, at this time also sets either a primary controller (PC) test flag 1251 or a secondary controller (SC) select flag 1252, depending on whether the text is to be sent to a downstream tributary or to controller 30. Finally, the DDU sets LL=0.

On the other hand, the text examined at block 1618 may be for the DDU itself. Most such texts relate to the DDU's so-called poll list, which is a list of the network addresses of tributaries 4a, 5b . . . 4n. The poll list is stored in RAM 520 as part of a health array 1200, with words 1202, 1204, 1206, etc., being the addresses of the tributaries, i.e., the poll list, and words 1203, 1205, 1207, etc., respectively storing the health of those tributaries.

If, as now assumed, the text is intended for the DDU, the latter executes the requested action, as indicated at 1706. If, for example, it was instructed to return a copy of the poll list to the DCD, it moves such a copy, which may be regarded as the results of a test, to an area of RAM 520 referred to as the results array, indicated in FIG. 12 at 1255. Or if, for example, the DDU was instructed to add a tributary to, or delete it from, the poll list, it moves a "did it" indication to the results array upon performing the requested action. The value of the originator is also stored in the results array in a way which associates it with the results. The originator and LL are then reset to zero, as indicated at 1714.

Returning now to block 1702, assume that a poll rather than a select, is received. The DDU examines the results array, as indicated at 1712, to see if results are available for the device which originated the poll, i.e., DCD 5. If, as in the example just given, results are available, they are embodied in the text of a poll response which is then transmitted i.e., placed in transmit buffer 1240, as indicated at 1713. In addition, the DDU sets LL=2.

If results are not available, the DDU determines as indicated at 1717, whether the device originating the poll, i.e., DCD 5, is the current originator. If so, this means that a request was previously received from the DCD but results have not yet been returned thereto. In this case, as indicated at 1718, a poll response is transmitted with the text thereof indicating the status of the request, e.g., "communications in progress" or "test in progress" and, again, the DDU sets LL=2.

If DCD 5 is not the originator, or if there is no originator, the DDU transmits health, as indicated at 1721. As previously noted, the health transmission is an EOT if the health of DDU 50, controller 30 and the downstream network is good and operational status is "normal." Otherwise a poll response is transmitted, with the text indicating the nature and location of the fault and/or operational status change and, as before, the DDU sets LL=2.

Continue to assume that a poll was received, and now assume that LL=2 because results, status or health have been transmitted. When the next transmission is received, as determined at block 1604, the DDU determines, as indicated at 1611, whether it is an ACK or a NAK. If it is an ACK, indicating that the previous transmission was received correctly by DCD 5, DDU 50 transmits an EOT, as indicated at 1612 and sets LL=0. If the transmission is a NAK, the previous transmission is retransmitted, as indicated at 1616. When an ACK is finally received, the DDU, as before, transmits an EOT and sets LL=0.

Figure 20:
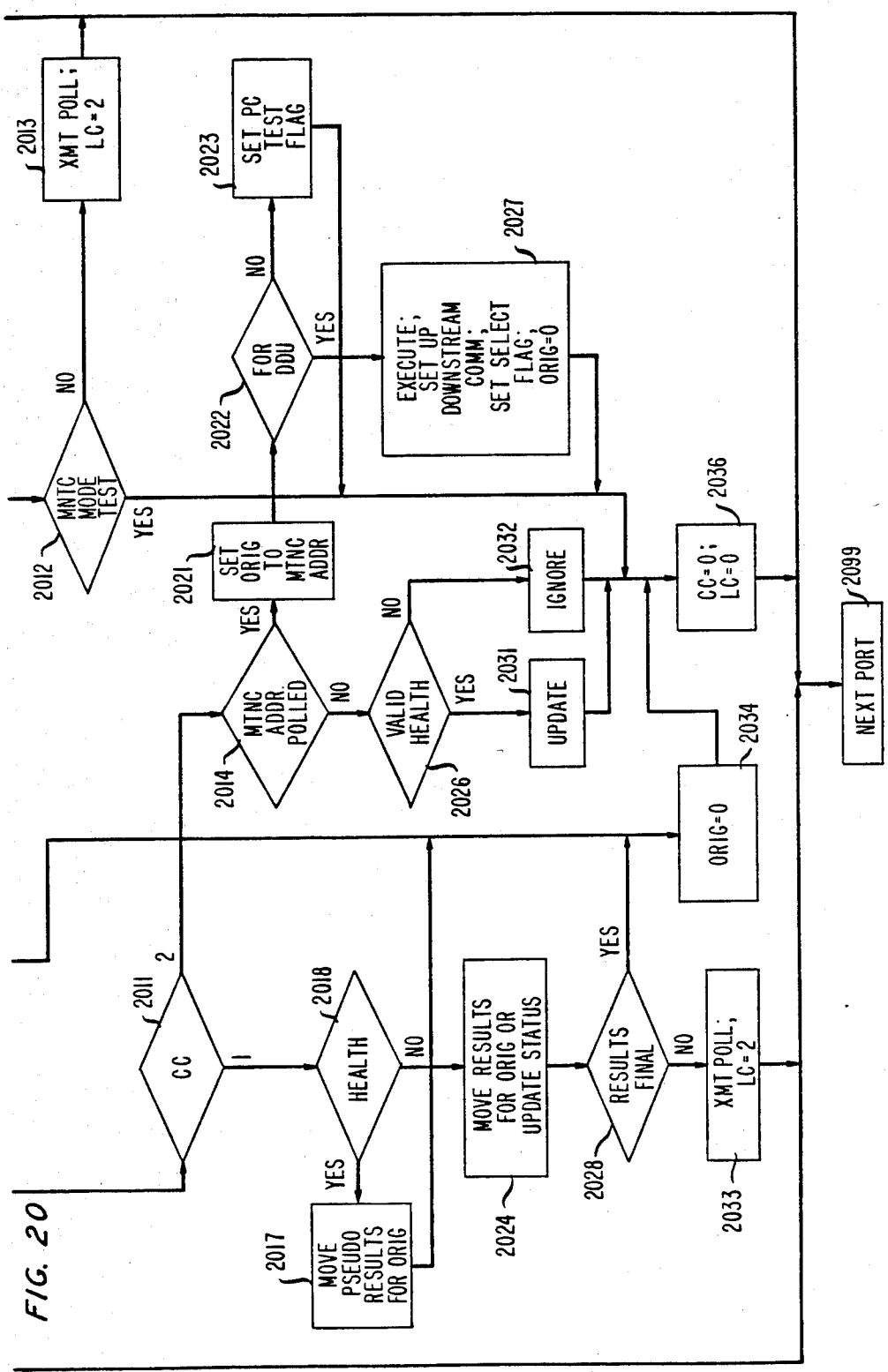

The processing performed by DDU 50 with respect to communications over the secondary channel, i.e., block 1116 of FIG. 11, is shown in the flowchart of FIGS. 19 and 20, when arranged as shown in FIG. 21. The DDU first determines, as indicated at 1901, whether secondary channel transmit buffer 1235 is empty. If not, it moves on to the next port. If it is empty, the value of a variable CC is determined, as indicated at 1904.

Assume that CC=0. The DDU then determines, as indicated at 1903, whether select flag 1252 has been set. Assume that flag 1252 is not set, indicating that no message text awaits downstream transmission. In this case, the DDU proceeds, as indicated at 1906, to set CC=2 and LC=2, LC being another variable. The DDU then determines, as indicated at 1908, whether the tributary most recently read for its health is the last tributary on its poll list. Assume that it is not. The next tributary on the poll list is then polled, as indicated at 1912.

When the next transmission is received, it is examined, as indicated at 1922, to determine if it is valie, i.e., whether it is either a valid poll response or an EOT. If it is not valid, a NAK is transmitted, as indicated at 1923, resulting in a retransmission from downstream. Once a valid transmission is received, an ACK is transmitted, as indicated at 1924 and the DDU sets LC=3. When the next transmission is received, it is examined, as indicated at 1916, to determine whether it is the expected EOT. Even if it is not, and after a predetermined time interval, the DDU transmits an EOT, as indicated at 1927. Since CC=2 at this time and the maintenance address (discussed below) was not polled, the DDU determines, as indicated at 2026, whether the transmission received contained valid health information, i.e., whether it is an EOT, indicating good health, or a poll response with a valid health indication in its text. If it does not contain valid health information, the transmission is ignored, as indicated at 2032, because no other type of response should have been transmitted. If it does contain valid health information, the health word in array 1200 associated with the tributary, which was read is updated, as indicated at 2031. In either case, the DDU sets CC=LC=0, as indicated at 2036.

Returning now to block 1908, assume that the tributary most recently read for health was the last tributary on the poll list. In this case, a maintenance poll is transmitted, as indicated at 1907. The maintenance poll is identical to a normal poll, except that a special maintenance address takes the place of a tributary address in the poll format. If a user at a particular tributary has previously entered a maintenance mode test request, the tributary responds to the maintenance poll with a poll response whose text specifies the test. As indicated at 2021, the DDU now sets the originator to the maintenance address. It then determines from the text of the maintenance poll response whether the maintenance mode test is directed to the DDU or to controller 30. (In this embodiment, these are the only two possibilities.)

If the test is for the DDU, the latter proceeds to execute it, as indicated at 2027. The results cannot, however, be moved to the results array because a tributary never initiates a read and thus, would never receive the results. Rather, the secondary channel select flag 1252 is set and a task block is set up, as previously described, to initiate a request, directed to the maintenance address, in which the message text contains the results of the maintenance mode test. The DDU then sets originator=0 and, as indicated at 2036, CC=LL=0.

If, alternatively, the maintenance mode test is directed to controller 30, the DDU sets test flag 1251, as indicated at 2023, indicating that a test awaits transmission to the controller. The manner in which this flag is read and the test passed to the controller, is discussed below. And, again, the DDU sets CC=LC=0.

Returning now to 1903, assume that the secondary channel select flag 1252 is set, indicating that a message text intended for a downstream device awaits transmission. In this case, as indicated at 1902, the DDU transmits a select to the tributary and sets CC=1.

The DDU thereafter determines, as indicated at 1918, whether an ACK or a NAK was received. If it was a NAK, but not the third NAK, as determined at 1917, the select is retransmitted at 1902. If it was the third NAK, pseudo-results—typically a "network busy" indication—are moved for the originator to the results array, as indicated at 1928. The entire request sequence is thus over and DDU sets originator=CC=LC=0, as indicated at 2034 and 2036.

If, on the other hand, an ACK is received at 1918, the DDU transmits a message, as indicated at 1931, with the text of the message being the text pointed to in the task block currently being executed. In addition, the DDU sets LC=1.

The next transmission, when received, is examined at 1921. If it is the third NAK, as determined at 1925, pseudo-results, such as "breakdown in communications" are moved to the results array for the originator, as indicated at 1928. If the transmission is a NAK, but is not the third one, the previously transmitted message is retransmitted, as indicated at 1931. If the transmission is an ACK, an EOT is transmitted, as indicated at 1932.

If the text within the message transmitted at 1931 reports the results of a maintenance mode test, as determined at 2012, nothing further is to be done, except to set CC and LC=0, as indicated at 2036.

In all other cases, the DDU is instructed to begin a read for results relative to the test or command embodied in the message text transmitted at 1931. To this end, the DDU transmits a poll and sets LC=2, as indicated at 2013. As before, the DDU thereafter checks the validity of the poll response, as indicated at 1922, and, ultimately, transmits an EOT, as indicated at 1927.

The DDU now checks the text of the poll response, as indicated at 2018. Since it is expecting results, the receipt of a health text indicates that there is a breakdown in communications and pseudo-results to this effect are moved to the results array for the originator, as indicated at 2017, and the DDU sets originator=CC=LC=0.

If the text of the poll response is not health, it must be results or a status. If it is the latter, a status word in RAM 520 (not shown in FIG. 12) is updated, as indicated at 2024. If the text contains results, these are moved to the results array for the originator. If the results are final, as determined at 2028, the DDU sets originator=CC=LC=0. If the results are not final, e.g., they are intermediate results of a test of very long duration, another poll is initiated, as indicated at 2033, and the DDU sets LC=2.

Figure 23:
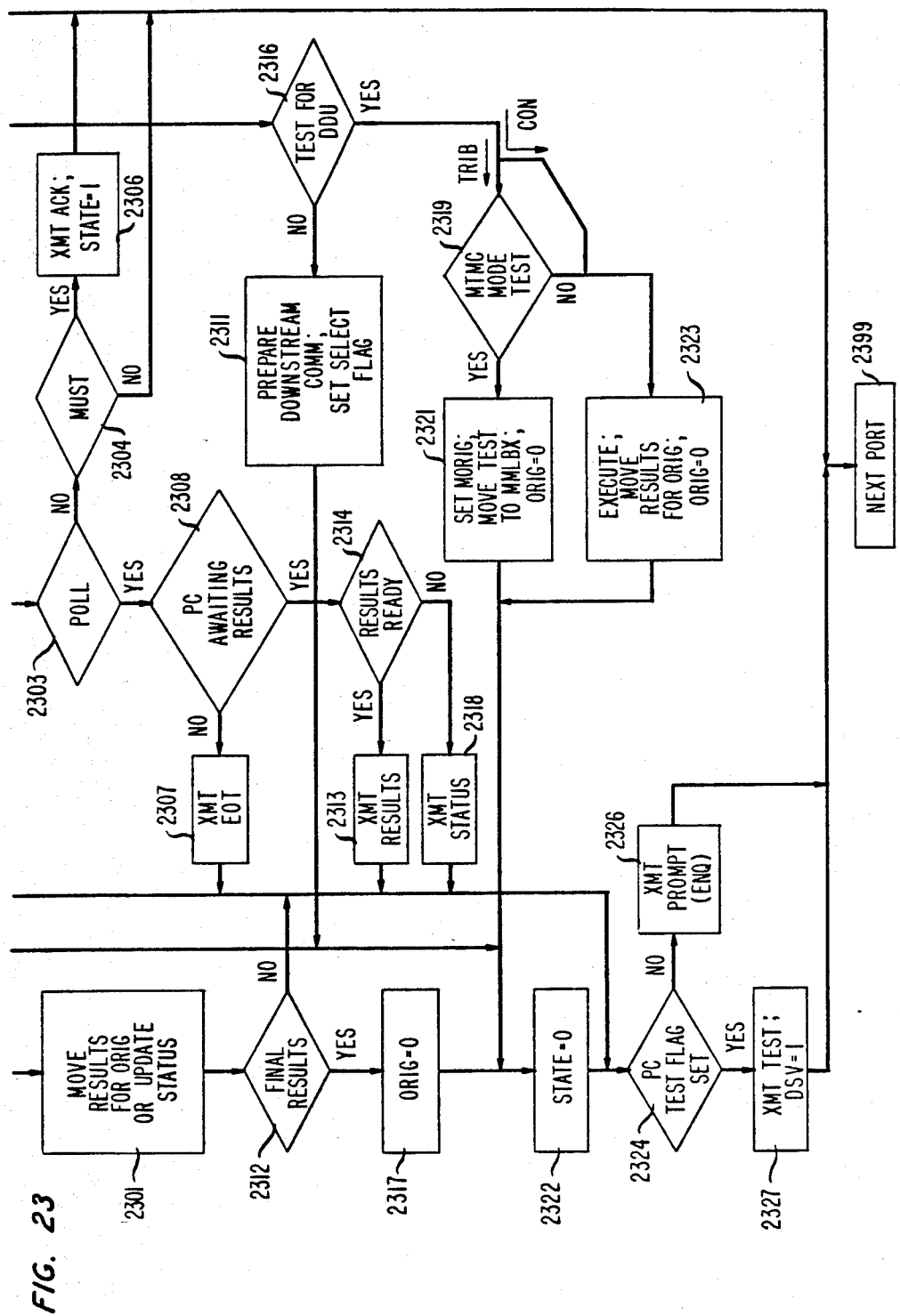

The processing performed by DDU 50 with respect to communications with controller 30, i.e., block 1118, is shown in the flowchart of FIGS. 22 and 23, when arranged as shown in FIG. 24. As described later, this flowchart also shows the processing performed by each of the tributary data sets 4a, 4b . . . 4n with respect to its primary controller. One block of this flowchart, 2319, pertains only to the processing performed by the tributaries. This block is ignored in the present discussion, as indicated by the small arrow labeled "CON" (control).

As before, the DDU first determines, as indicated at 2201, whether the associated transmit buffer 1230 is empty. If not, it moves on to the next port. If, on the other hand, the transmit buffer is empty, the value of a variable STATE is determined, as indicated at 2203. Assume STATE=0. Assume furthermore that, because it has previously transmitted a prompt to the controller, as discussed just below, DDU 50 is expecting a transmission therefrom. If, as indicated at 2208, an EOT is received, this indicates that the health of the primary side of the data set is OK and health word 1201 is updated, as indicated at 2207. (Although not shown in the flowchart, the DDU simply moves on to the next port if STATE=0 but no character has yet been received.)

The DDU then examines primary controller (PC) test flag 1251, as indicated at 2324, to determine whether a test awaits transmission to controller 30. If so, the test is transmitted to the controller, as indicated at 2327, and a variable DSV is set to 1, serving as a flag to the DDU that a test has been transmitted. If the PC test flag is not set, the DDU transmits a "prompt" in the form of an ENQ character as indicated at 2326. The prompt is an indication to the controller that the DDU is ready to accept further transmissions.

If, with STATE=0, the transmission is an STX (start of text), as indicated at 2213, this means that controller 30 is in the process of transmitting a text. In this case, the DDU sets STATE=2, as indicated at 2214. As indicated at 2202, the DDU thereafter continually examines the characters of the text as they are received until it detects an ETX (end of text) indicating that the text is complete. It then determines, as indicated at 2206, whether the text contains a health message.

If the DDU has previously transmitted a test to the controller and final results have not yet been reported back, the controller should have interpreted the prompt which preceded the text as a read for results. In such a situation DSV=1 so that if the text does contain a health message, the DDU moves pseudo-results, e.g., "breakdown in communications" to the results array for the originator. And, whether or not the DDU was expecting test results, it updates health word 1201, as indicated at 2219, sets STATE=0 and, transmits a test, if one awaits transmission to the controller, or otherwise a prompt.

If the text is not health, and DSV=0, the text is not anything the DDU expects and, again, sets STATE=0 and transmits a test or a prompt. Finally, if the text is not health, and DSV=1, the DDU acts, as indicated at 2301, to update a status word associated with this port if the text contains a status message, or to move results to the results array for the originator if the text contains results. If the results are final, as determined at 2312, the DDU sets originator=0, as indicated at 2317, resets STATE=0 and transmits a test or a prompt. If the results are not final, the PC test flag cannot have been set since the originator is non-zero and thus, the only option is to transmit a prompt. And since STATE=2 still, the DDU will continue to expect status or result texts from controller 30 until final results are received.

With respect to the functions thus far described, controller 30 is downstream of DDU 50 in the network diagnostic system hierarchy, because the prompt is, in effect, a poll by the DDU in response to which the controller provides poll response-type texts, i.e., health, status or results. And, since the transmission of a test from the DDU to the controller is an instruction for the controller to do something, it is analogous to a message text.

With respect to the functions now to be described, controller 30 is upstream of DDU 50 and the prompt is, in effect, nothing more than an indication from the DDU that it is able to accept transmissions.

Assume in particular that, once again, STATE=0 but DDU 50 now receives a select character from controller 30, as indicated at 2217. The DDU responds in a way similar to the way in which it responds to selects from DCD 5. If the originator is non-zero, as determined at 2218, the DDU cannot accept a select and so it transmits a NAK, as indicated at 2221. If the originator is zero, the DDU sets it to indicate that the controller is the originator, as indicated at 2223. The DDU also transmits an ACK and sets STATE=1.

The DDU now expects to receive a text. Once a complete text has been received, as determined at 2204, it examines the text to see if it is directed to the DDU, as indicated at 2316. If the text is not directed to the DDU, it prepares task blocks to transmit the text downstream and sets select flag 1252, as indicated at 2311. If, on the other hand, the text is directed to the DDU, it executes the test or command embodied therein, as indicated at 2323, moves the results to the results array for the originator, i.e., controller 30, and sets the originator to zero.

Assume now that instead of a select character, the DDU receives a poll character, as indicated at 2303. The DDU examines a flag that is set when a select is received to determine whether the DDU thinks that controller 30 is expecting results, as indicated at 2308. If it is not expecting results, the controller should never have transmitted the poll and, as indicated at 2307, the DDU transmits an EOT, this indicates to the controller that something has gone awry. If, on the other hand, the DDU thinks that the controller is expecting results, it determines, as indicated at 2314, whether the results are ready in the results array. If so, the results are transmitted, as indicated at 2313. If not, status is transmitted, as indicated at 2318.

The only other character which DDU 50 might receive from controller 30 in response to a prompt is a "must", as indicated at 2304. A "must" is special kind of select which the DDU must respond to with an ACK, even if the originator is non-zero. It is used in special situations. Assume, for example, that DDU 50 has received a request from DCD 5 in which the text specifies a test to be performed by controller 30. Assume further that the nature of the test is such that controller 30 must initiate requests to a tributary data set. If the controller attempts to initiate such a request by transmitting a select to DDU 50, the latter would transmit a NAK since the originator is non-zero. The use of a "must" avoids this problem.

Since the DDUs of tributaries 4a, 4b . . . 4n are downstream of DDU 50, they process their communications with DDU 50 in substantially the same way that DDU 50 processes its communications with DCD 5. Thus, the flowchart of FIGS. 16–17 applies to the processing performed by the tributary DDUs at their secondary channel ports. As indicated by the arrows labeled "TRIB" in these FIGS., the processing performed by the tributaries includes, in addition to the blocks previously described, blocks 1621, 1701, 1707, 1711 and 1716. These blocks represent the processing performed by the tributaries at their secondary channel ports in connection with maintenance mode tests.

Moreover, the DDUs of tributaries 4a, 4b . . . 4n process their communications with their respective controllers in substantially the same way that DDU 50 processes its communications with controller 50. Thus, the flowchart of FIGS. 22–23 applies to the DDU/controller communications at the tributaries as well. In this flowchart, as again indicated by the arrows labeled "TRIB", blocks 2319 and 2321 represent the processing performed by the tributaries at their primary controller ports in connection with maintenance mode tests.

Assume that a user at tributary data set 4n wishes to have a test executed which involves control data set 10, such as a test which involves the transmission of pseudo-random words over the primary channel between these two sets. In order to accomplish this, the user must first command the tributary, via its front panel, to enter the maintenance mode. This allows the user to scroll through an expanded "menu" which includes tests which could not otherwise be asked for from the front panel, with acronyms or abbreviations for the tests appearing one after the other on the alphanumeric display. When the acronym for the desired test appears on the tributary's display, the user depresses the execute button. As a result, the primary controller of the tributary data set transmits a select to the DDU thereof at the first opportunity and, upon receiving an ACK, transmits a text in which the test requested from the tributary's front panel is identified. (The manner in which the primary controller carries out the above-described functions is discussed in further detail in the co-pending, commonly-assigned patent application of E. Cheng-Quispe et al, Ser. No. 156,869, filed June 5, 1980, which is hereby incorporated by reference.)

A text embodying a maintenance mode request is indicated by the tributary's controller to be a test for the tributary's DDU. Upon determining, in this example, that the text is directed to itself, the determination being made at 2316, the DDU examines the text to see if it embodies a maintenance test, as indicated at 2319.

In the present example, the test is, in fact, a maintenance mode test. As a result, as indicated at 2321, the tributary DDU sets a variable referred to as the maintenance originator (MORIG) to identify the controller of the tributary as the originator of the maintenance mode test. (In the present illustrative embodiment, the controller is the only possible maintenance originator. In other embodiments, however, a tributary DDU could be arranged to receive maintenance requests from other sources.) As further indicated at 2321, the tributary DDU, in addition, moves the maintenance mode test to an area of the tributary's RAM referred to as the maintenance mailbox, and sets orginator=0.

In this embodiment, RAM 520 of control data set 10 does not include a maintenance originator or maintenance mailbox inasmuch as there is no upstream device to which maintenance mode tests originating from data set 10 would be sent. It is convenient, however, to regard FIG. 12 as depicting not only RAM 520, but also the RAM of tributary data set 4n. FIG. 12 thus shows a maintenance originator 1242 and a maintenance mailbox 1244. (Note, too, that the RAM of tributary data set 4n would not include flag 1252 since there are no secondary channel devices downstream.)

At a subsequent time, the DDU of tributary data set 4n will receive a poll in which the maintenance address is specified. Since the maintenance originator is now non-zero, the two conditions indicated at 1621 are fulfilled and the tributary DDU looks at the next incoming character, as indicated at 1702. Since it is a "p," and since the maintenance mailbox is not empty, as determined at 1711, the contents of the maintenance mailbox are transmitted in the text of a poll response, as indicated at 1716 and the tributary DDU sets LL=2 so that an EOT will be transmitted once an ACK has been received from upstream. The maintenance mode test is thus transmitted upstream where it is acted upon in the manner previously described.

When the results of the maintenance mode test are subsequently transmitted back to tributary data set 4n, as also previously described, the tributary DDU regards them as being for itself. Accordingly, upon making a determination of same at 1618 and 1701, the DDU moves the results to the results array for the maintenance originator, as indicated at 1707 and then sets maintenance originator=originator=LL=0.

FIG. 10 shows the various files, routines and programs within ROM 515 which implement the operations of the DDU as described above. This FIG. can also be regarded as depicting the ROM within each tributary data set.

In particular, DDU file 1001 implements initialization 1101, diagnostic checks 1111, bus interface I/O 1113, and the processing required to read and write characters out of and into the transmit and receive buffers, including the pertinent ones of interrupt service routines 1120.

SYSTEM 1002 contains the tests performed by the DDU—principally tests relating to the poll list.

M_CCONTROL 1004 controls the polling of tributaries for health and the polling of the maintenance address. It also carries out the operations necessary to transmit a test or maintenance mode test results downstream and to get results routed back to the originator.

M_SELECT 1007 and M_POLL 1011 respectively implement the request and poll protocols of FIGS. 14 and 15 from the standpoint of the upstream device.

R_CCONTROL 1012 implements the message switching functions of the DDU including the examination of messages to determine their destinations and the preparation of communications to go downstream via the setting up of task blocks.

R_POLL 1018 and R_SELECT 1019 respectively implement the read and request protocols of FIGS. 15 and 14, respectively, from the standpoint of the downstream device.

GET—HEALTH 1021 formats health texts for communication upstream.

DS_IN 1022 and DS_OUT 1024 respectively implement the protocols for receiving characters from, and transmitting characters to, controller 30.

UPDATE_HEALTH 1026 sets a failure bit if the diagnostic checks detect a fault.

I/O 1027 contains functions used in the moving of characters from and to the various receive and transmit buffers.

As indicated at 1029, ROM 515 may include other files, routines and functions not pertinent to the foregoing description.

Figure 25:
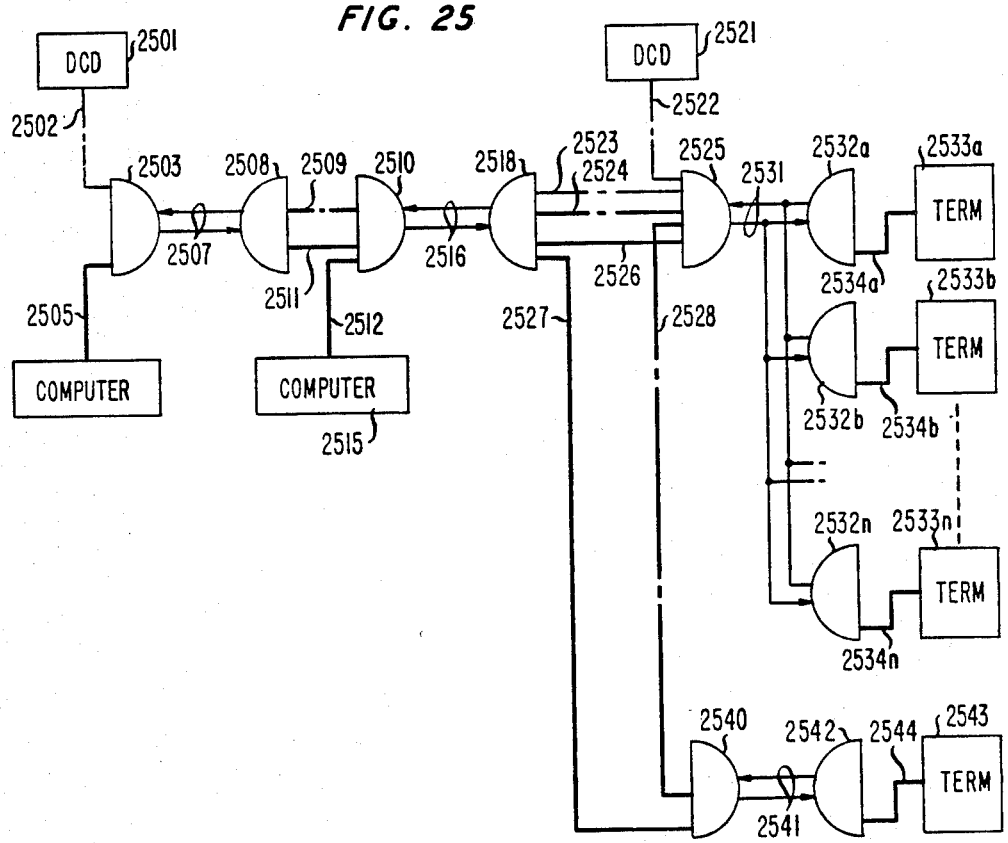
FIG. 25 is a block diagram of an extended voiceband data communications network in which the present invention can be used.

FIG. 25 depicts an extended data set network in which the present invention is used. In this network, a first computer 2505 communicates with a terminal 2543 and a second computer 2515 communicates with terminals 2533a, 2533b . . . 2533n.

Figure 2:
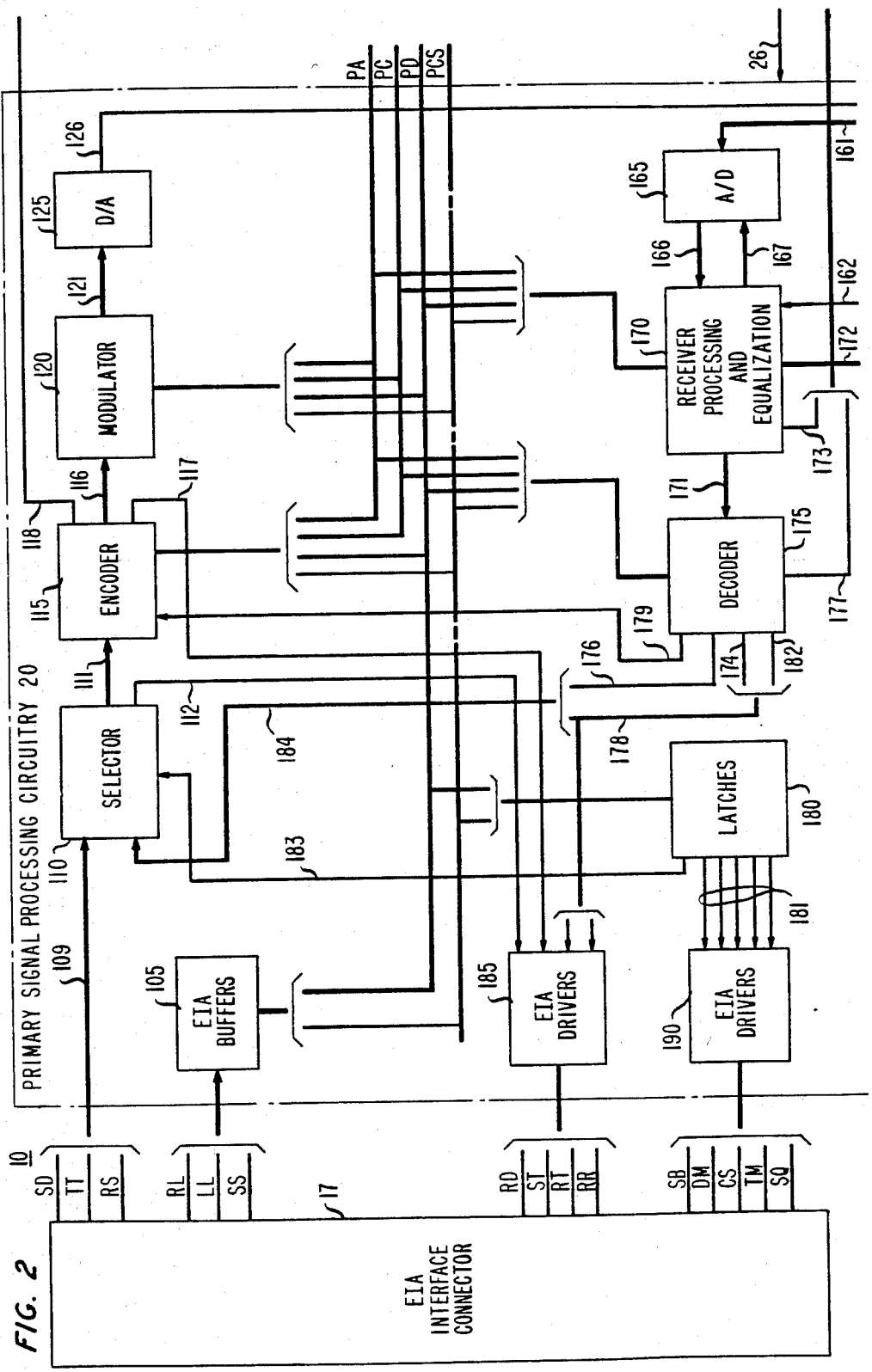
Figure 3:
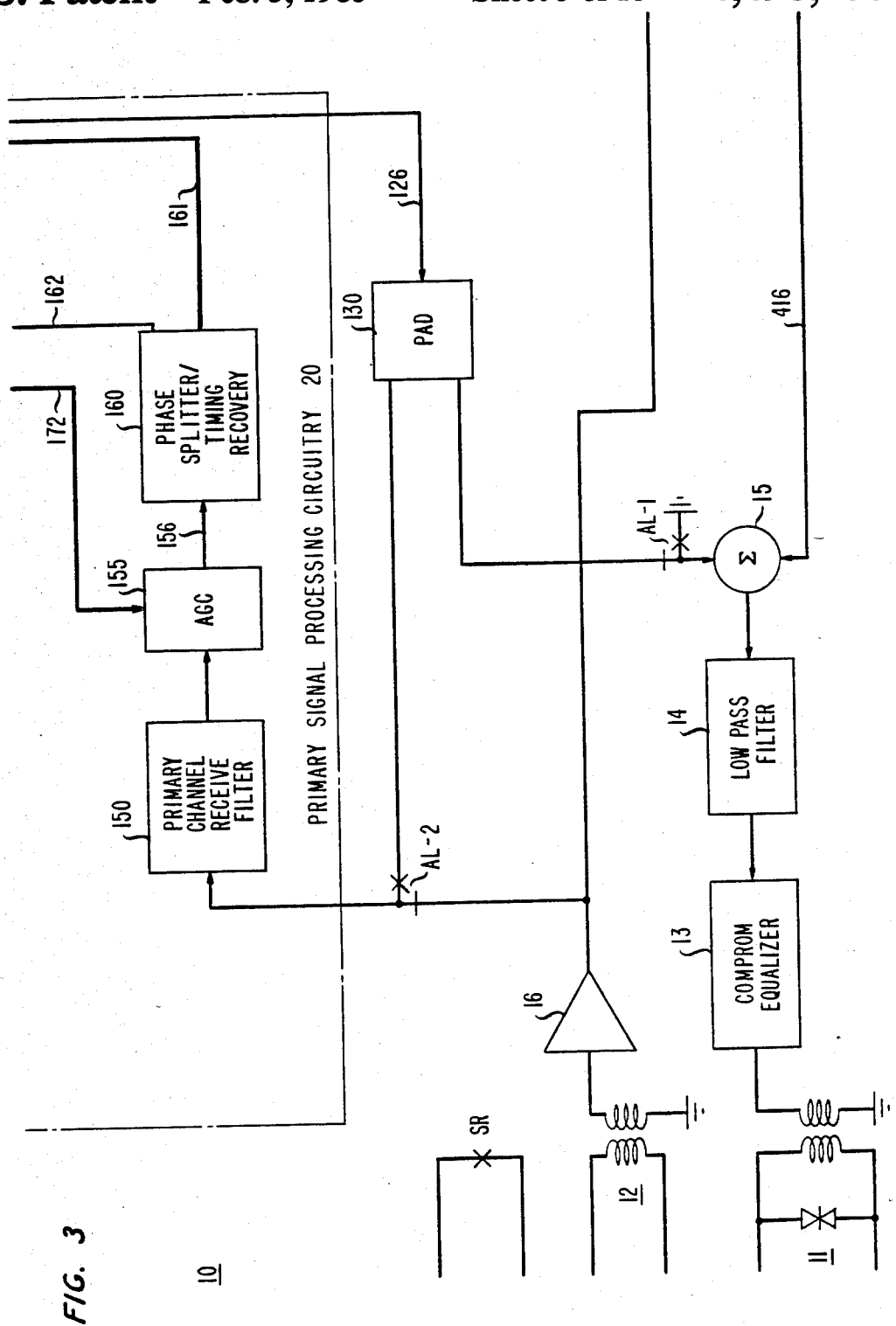

In particular, computer 2505 applies a 4800 bit per second (bps) data signal to a 4800 bps data set 2503 via an EIA cable 2505 which includes the EIA leads shown in FIG. 2. Data set 2503 transmits the data over four-wire private line 2507 to 4800 bps data set 2508. The latter applies the data to 9600 bps data set 2510, with which it is co-located, via EIA cable 2511. The latter connects the appropriate EIA output leads of data set 2508 to the appropriate EIA input leads of data set 2510, e.g., SD to RD, RD to SD, etc. Data set 2510 multiplexes the data on cable 2511 with a 4800 bps data signal from computer 2515, that signal being provided along with its associated EIA interface leads in EIA cable 2512.

The resulting 9600 bps data signal is transmitted via four-wire private line 2516 to 9600 bps data set 2518. The latter applies the data signal which originated at computer 2505 and the associated EIA signals to 4800 bps data set 2540, with which data set 2518 is co-located, via EIA cable 2527. Data set 2540 transmits the data to terminal 2543 via four-wire private line 2541, 4800 bps data set 2542 and EIA cable 2544.

At the same time, the data signal which originated at computer 2515 is applied by data set 2518 to 4800 bps data set 2525, with which data set 2518 is also co-located, along with its associated EIA leads in EIA cable 2526. Data set 2525 is analagous to data set 10 of FIG. 1. It transmits the data from computer 2515 to the appropriate terminal via four-wire private line 2531, a respective one of 4800 bps data sets 2532a, 2532b . . . 2532n and EIA cables 2534a, 2534b . . . 2534n. Data sets 2503 and 2525 communicate with respective diagnostic control devices 2501 and 2521 via respective control channels 2502 and 2522. Diagnostic control device 2521 also communicates with data set 2518 via an extension 2523 of control channel 2522 which is provided via a daisy chain arrangement at data set 2525.

Data set 2503 is substantially similar to data set 10. Data sets 2532a, 2532b . . . 2532n are substantially similar to data sets 4a, 4b . . . 4n of FIG. 1. Data sets 2508 and 2518 are also similar to data sets 2532a, 2532b . . . 2532n, except that their DDUs have a fourth port, similar to circuitry 70, which provides an interface between those DDUs and respective diagnostic channels 2509 and 2524. These diagnostic channels provide data sets 2508 and 2518 with a signal path for transmissions downstream and, in addition to the signal paths themselves, include diagnostic channel request-to-send, clear-to-send and ground leads. The communications processing performed by data sets 2508 and 2518 at their diagnostic channel ports is substantially similar to that performed at the secondary channel port of control data set 10.

Data sets 2510, 2525 and 2540 are substantially similar to data set 10 except that they, too, have respective diagnostic channel ports which are used to interface with diagnostic channels 2509, 2524 and 2528, respectively, the latter being an extension of diagnostic channel 2524 via another daisy chain connection at data set 2525. The signal processing performed by these data sets at their respective diagnostic channel ports is substantially the same as that performed at the control channel port of data set 10.

The foregoing merely illustrates the principles of the invention. Those skilled in the art will be able to devise numerous arrangements which, although not explicitly shown or described herein, embody the principles of the invention and thus do not depart from its spirit and scope.

We claim:

1. A method for initiating the communication of a diagnostic text from a first diagnostic communication device in a telephone voiceband data communication system to a second diagnostic communication device in said system, said system including a third diagnostic communication device which is adapted to communicate to said second device diagnostic texts received by said third device from said first device and intended for said second device, said second and third devices being co-located with respective data sets and at least one of said data sets being of the type adapted to receive input data and to transmit to the other of said data sets via a voiceband telephone channel a voiceband data signal representing said received input data, said method comprising the steps of transmitting a select from said first device to said third device, said select comprising a first select control character, addresses respectively associated with said first and third devices, a character identifying said select as a select, and a second select control character, and transmitting a downstream communication from said first device to said third device upon receipt by said first device from said third device of an upstream communication, said downstream communication being substantially identical to said select if said upstream communication includes a negative acknowledgement character and said downstream communication being a message if said upstream communication includes a positive acknowledgement character, said message comprising a first message control character, a header which includes an address associated with said second device and which is such as to indicate that said text is not intended for said third device, a second message control character, said text, and a third message control character.

2. The invention of claim 1 wherein said first select control character, select-identifying character, second select control character, negative acknowledgement character, positive acknowledgement character, and first, second and third message control characters are the ASCII characters EOT, s, ENQ, NAK, ACK, SOH, STX and ETX, respectively.

3. The invention of claim 1 comprising the further step of retransmitting said message in response to receipt by said first device from said third device of said negative acknowledgement character after said message is transmitted.

4. The invention of claim 3 wherein said first select control character, select-identifying character, second select control character, negative acknowledgement character, positive acknowledgement character, and first, second and third message control characters are the ASCII characters EOT, s, ENQ, NAK, ACK, SOH, STX and ETX, respectively.

5. The invention of claim 1 wherein said upstream communication includes the addresses associated with said first and third devices.

6. The invention of claim 5 wherein said first select control character, select-identifying character, second select control character, negative acknowledgement character, positive acknowledgement character, and first, second and third message control characters are the ASCII characters EOT, s, ENQ, NAK, ACK, SOH, STX and ETX, respectively.

* * * * *